(12) United States Patent
Freedman et al.

(10) Patent No.: US 6,259,805 B1
(45) Date of Patent: Jul. 10, 2001

(54) BIOMETRIC SECURITY ENCRYPTION SYSTEM

(75) Inventors: Gordon S. Freedman, Nepean; Laurence Hamid; Stephen J. Borza, both of Ottawa, all of (CA)

(73) Assignee: DEW Engineering and Development Limited, Ottawa (CA)

( * ) Notice: Subject to any disclaimer, the term of this patent is extended or adjusted under 35 U.S.C. 154(b) by 0 days.

(21) Appl. No.: 09/045,810

(22) Filed: Mar. 23, 1998

Related U.S. Application Data

(63) Continuation-in-part of application No. 08/760,228, filed on Dec. 4, 1996, now abandoned, and a continuation of application No. 08/804,267, filed on Feb. 21, 1997, now Pat. No. 6,038,334, and a continuation of application No. 08/899,704, filed on Jul. 24, 1997, now Pat. No. 6,072,891.

(51) Int. Cl.[7] ........................................ G06K 9/00
(52) U.S. Cl. ................................ 382/124; 382/115
(58) Field of Search .................... 382/115, 116, 382/124, 125; 340/825.34

(56) References Cited

U.S. PATENT DOCUMENTS

| | | | |
|---|---|---|---|
| 5,229,764 | * | 7/1993 | Matchett et al. ............. 340/825.34 |
| 5,493,621 | * | 2/1996 | Matsumura ........................ 382/125 |
| 5,613,012 | * | 3/1997 | Hoffman et al. .................. 382/115 |
| 5,613,014 | * | 3/1997 | Ehsera et al. ..................... 382/124 |
| 5,999,637 | * | 12/1999 | Toyoda et al. ................... 382/124 |

* cited by examiner

Primary Examiner—Bhavesh Mehta
(74) Attorney, Agent, or Firm—Freedman & Associates

(57) ABSTRACT

A method of registering biometric data is disclosed wherein a number of instances of input biometric data are accepted from a new user during a registration process. Each of these data samples are compared against existing templates to identify those templates posing a significant risk of confusion with a data sample. Those templates are identified and information relating to those templates is stored with the enrolled template of the new user. When a user is identified as the new user, the system automatically verifies that the data sample does not also result in identification as one of the identified templates.

26 Claims, 19 Drawing Sheets

Table of comparison scores for 3 instances of same fingerprint a0000404.i vs b0000404.i: 54.01
a0000404.i vs c0000404.i: 64.22
b0000404.i vs a0000404.i: 40.09
b0000404.i vs c0000404.i: 86.20
c0000404.i vs a0000404.i: 32.87
c0000404.i vs b0000404.i: 79.20

Fig. 7

Fig. 9
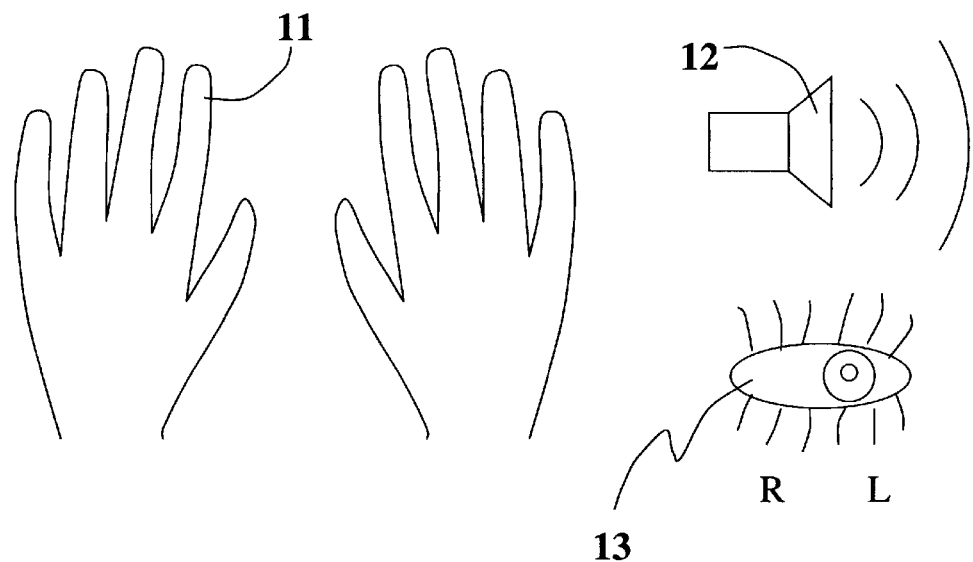
Fig. 9a
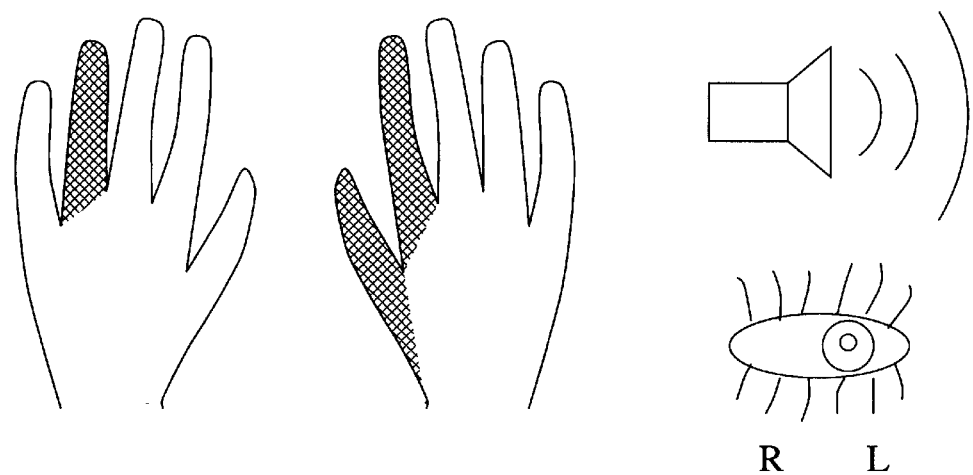
Fig. 9b
Please provide Fingerprint from left ring finger.
Please provide Fingerprint from right thumb.
Please provide Fingerprint from right index finger.

BIOMETRIC SECURITY ENCRYPTION SYSTEM

This is a continuation-in-part of U.S. patent application Ser. No. 08/760,228, filed Dec. 4, 1996, now abandoned. This is also a continuation of U.S. patent application Ser. No. 08/804,267 filed Feb. 21, 1997, now U.S. Pat. No. 6,038,334 and a continuation of U.S. patent application Ser. No. 08/899,704 filed on Jul. 24, 1997, now U.S. Pat. No. 6,072,891.

FIELD OF THE INVENTION

This invention relates generally to identification of individuals and more particularly relates to a method of selecting a biometric template for identification of individuals.

BACKGROUND OF THE INVENTION

Computer security is fast becoming an important issue. With the proliferation of computers and computer networks into all aspects of business and daily life—financial, medical, education, government, and communications—the concern over secure file access is growing. A common method of providing security is using passwords. Password protection and/or combination type locks are employed for computer network security, automatic teller machines, telephone banking, calling cards, telephone answering services, houses, and safes. These systems generally require the knowledge of an entry code that has been selected by a user or has been preset.

Preset codes are often forgotten, as users have no reliable method of remembering them, Writing down the codes and storing them in close proximity to the access control device (i.e. the combination lock) results in a secure access control system with a very insecure code. Alternatively, the nuisance of trying several code variations renders the access control system more of a problem than a solution.

Password systems are known to suffer from other disadvantages. Usually, a user specifies a password. Most users, being unsophisticated users of security systems, choose passwords that are relatively insecure. As such, many password systems are easily accessed through a simple trial and error process.

A security access system that provides substantially secure access and does not require a password or access code is a biometric identification system. A biometric identification system accepts unique biometric information from a user and identifies the user by matching the information against information belonging to registered users of the system. One such biometric identification system is a fingerprint recognition system.

In a fingerprint input transducer or sensor, the finger under investigation is usually pressed against a flat surface, such as a side of a glass plate; the ridge and valley pattern of the finger tip is sensed by a sensing means such as an interrogating light beam.

Various optical devices are known which employ prisms upon which a finger whose print is to be identified is placed. The prism has a first surface upon which a finger is placed, a second surface disposed at an acute angle to the first surface through which the fingerprint is viewed and a third illumination surface through which light is directed into the prism. In some cases, the illumination surface is at an acute angle to the first surface, as seen for example, in U.S. Pat. Nos. 5,187,482 and 5,187,748. In other cases, the illumination surface is parallel to the first surface, as seen for example, in U.S. Pat. Nos. 5,109,427 and 5,233,404. Fingerprint identification devices of this nature are generally used to control the building-access or information-access of individuals to buildings, rooms, and devices such as computer terminals.

U.S. Pat. No. 4,353,056 in the name of Tsikos issued Oct. 5, 1982, discloses an alternative kind of fingerprint sensor that uses a capacitive sensing approach. The described sensor has a two dimensional, row and column, array of capacitors, each comprising a pair of spaced electrodes, carried in a sensing member and covered by an insulating film. The sensors rely upon deformation to the sensing member caused by a finger being placed thereon so as to vary locally the spacing between capacitor electrodes, according to the ridge/trough pattern of the fingerprint, and hence, the capacitance of the capacitors. In one arrangement, the capacitors of each column are connected in series with the columns of capacitors connected in parallel and a voltage is applied across the columns. In another arrangement, a voltage is applied to each individual capacitor in the array.

Sensing in the respective two arrangements is accomplished by detecting the change of voltage distribution in the series connected capacitors or by measuring the voltage values of the individual capacitances resulting from local deformation. To achieve this, an individual connection is required from the detection circuit to each capacitor.

Before the advent of computers and imaging devices, research was conducted into fingerprint characterisation and identification. Today, much of the research focus in biometrics has been directed toward improving the input transducer and the quality of the biometric input data. A second important issue to be addressed is the identification process itself and more particularly, the registration process.

A common method of registering users for a biometric identification system is to capture biometric input information, characterise it, and store it as a template. The same user then provides biometric input information to the system for identification. This is repeated several times and if identification is successful, the user and their biometric template are registered. Further, the system requires an experienced operator to accept or reject instances of biometric information intended as templates.

A further method of registering users for a biometric identification system is to capture a plurality of instances of biometric input information from a same user and to characterise each instance. A composite biometric template is then constructed in dependence upon the plurality of instances provided. Such a system is complicated and it requires an experienced operator to accept or reject instances of biometric information intended for template construction.

OBJECT OF THE INVENTION

It is an object of this invention to provide a means of selecting a biometric template or biometric information from which to derive a template.

It is an object of the invention to provide a method of training users to more effectively use biometric identification systems.

SUMMARY OF THE INVENTION

In accordance with the invention there is provided a method of identifying an individual presenting a biometric information source to a system. The method comprises the steps of:

receiving a biometric information sample from the biometric information source of the individual;

characterising the biometric information sample;

comparing the characterised biometric information sample against some of a plurality of stored templates to identify a template that closely matches the characterised biometric information sample;

determining further templates from the plurality of stored templates, the further templates determined from data associated with the identified template;

comparing the characterised biometric information sample against a template from the further templates to determine a likelihood that the characterised biometric information sample closely matches the template from the further templates; and identifying the individual when a match between the characterised biometric information sample and the template from the further templates has a likelihood outside a first range of likelihoods.

In accordance with the invention there is provided a method performing one of user authorisation and user identification for use in a system wherein biometric data are stored in a database. The method comprises the steps of:

providing a biometric information sample;

comparing data based on the biometric information sample and the biometric data to locate data within the biometric data that is indicative of a substantial match with the biometric information sample;

determining further information from data associated with the located data indicative of a substantial match, the further data indicative of biometric data that has a known potential for indicating false acceptance; comparing the data based on the biometric information sample and the further data from the database to provide comparison results; and, when the comparison results are indicative of no further substantial matches with the biometric information sample, performing at least one of user authorisation and user identification.

In accordance with the invention there is provided a method of identifying comparisons indicative of potential false for use in a system wherein biometric data are stored in a database. The method comprises the steps of:

comparing data based on a biometric information sample associated with first data within the biometric data and the biometric data to locate second data within the biometric data that is indicative of a substantial match with the biometric information sample to provide comparison results; and, when a comparison result is indicative of a substantial match and the second data is other than the first data, storing information in association with the first data the information indicative of the second data.

In accordance with the invention there is provided a method of storing data relating to biometric information in a database for use in identifying individuals. The method comprises the steps of:

storing data associated with a first biometric information sample and a corresponding identification; and, storing a list of data associated with other biometric information corresponding to other identifications within the database, some of the biometric data associated with the other biometric information having a significant similarity to data associated with the first biometric information sample.

In accordance with the invention there is provided a method of registering biometric information from a source, comprising the steps of:

providing an instance of biometric information from the source;

storing a template relating to the provided biometric information in a database comprising a plurality of templates;

comparing the biometric information against a further template to determine a likelihood that the biometric information matches the further template;

when the likelihood is within a first range of likelihoods, storing data relating to the further template in association with the data based on the biometric information.

In an embodiment when the likelihood is within the first range of likelihoods, storing data relating to a biometric information source selected so as to distinguish between the provider of the previously stored biometric information and the provider of the biometric information from which the further template is determined.

In accordance with the invention there is provided a method providing an instance of biometric information from the source;

storing a template relating to the provided biometric information in a database comprising a plurality of templates;

comparing previously stored biometric information against the stored template to determine a likelihood that the previously stored biometric information matches the stored template; and, when the likelihood is within a first range of likelihoods, storing data relating to the previously stored biometric information associated with the data based on the biometric information.

The advantages of a system in accordance with this invention are numerous. For example, registration of authorized users requires little time and expense. The chance of deriving a biometric template from poor biometric information is greatly reduced.

BRIEF DESCRIPTION OF THE DRAWINGS

An exemplary embodiment of the invention will now be described in conjunction with the attached drawings, in which:

FIG. 1b is a representation of another instance of a fingerprint image captured by an optical fingerprint imaging means imaging the same fingertip as that of FIG. 1a;

FIG. 1c is a representation of another instance of a fingerprint image captured by an optical fingerprint imaging means imaging the same fingertip as that of FIG. 1a;

FIG. 7 is a chart showing results from registrations using each of the fingerprint images of FIGS. 1a, 1b, and 1c as templates and the others as biometric input information;

FIG. 9 is a simplified diagram of a user interface for entering parameters according to the invention;

FIG. 9a is a simplified diagram of FIG. 9 with some parameters selected for entry;

FIG. 9b is a simplified diagram of a display having prompts thereon requesting provision of biometric information from predetermined biometric information sources;

DETAILED DESCRIPTION

The invention will be described with respect to finger print registration. The method of this invention is useful in other biometric template selection processes as well.

Figure 1A:
FIG. 1a is a representation of a fingerprint image captured by an optical fingerprint imaging means.
Figure 1B:
Figure 1C:

Referring to FIGS. 1a, 1b, and 1c, a fingerprint is shown. A fingerprint is substantially unique and is identifiable by a series of criteria. These criteria include core size, core type, location of minutia, ridge spacing, ridge type, etc. Each feature can be located and stored for later registration of unknown prints. Unfortunately, accurately mapping out all features and determining registration based on partial prints and skewed prints is very time consuming; and, it is beneficial to minimize the time required to register a print. Therefore, not all features are analyzed to register each print.

A comparison of the fingerprint of FIG. 1a, FIG. 1b, and FIG. 1c will show them to have a same source; however, a comparison of the images directly is difficult, as they are each different. Each time a person places a fingertip onto a fingerprint scanner, a slightly different image is captured. From one instance to another a fingerprint may be shifted, skewed, cover different parts of the fingertip or be applied with different pressure. Since each captured image is substantially unique, it is likely that some images form better templates for registration than others. A method of selecting those fingerprints that form better templates is herein disclosed.

Figure 2:
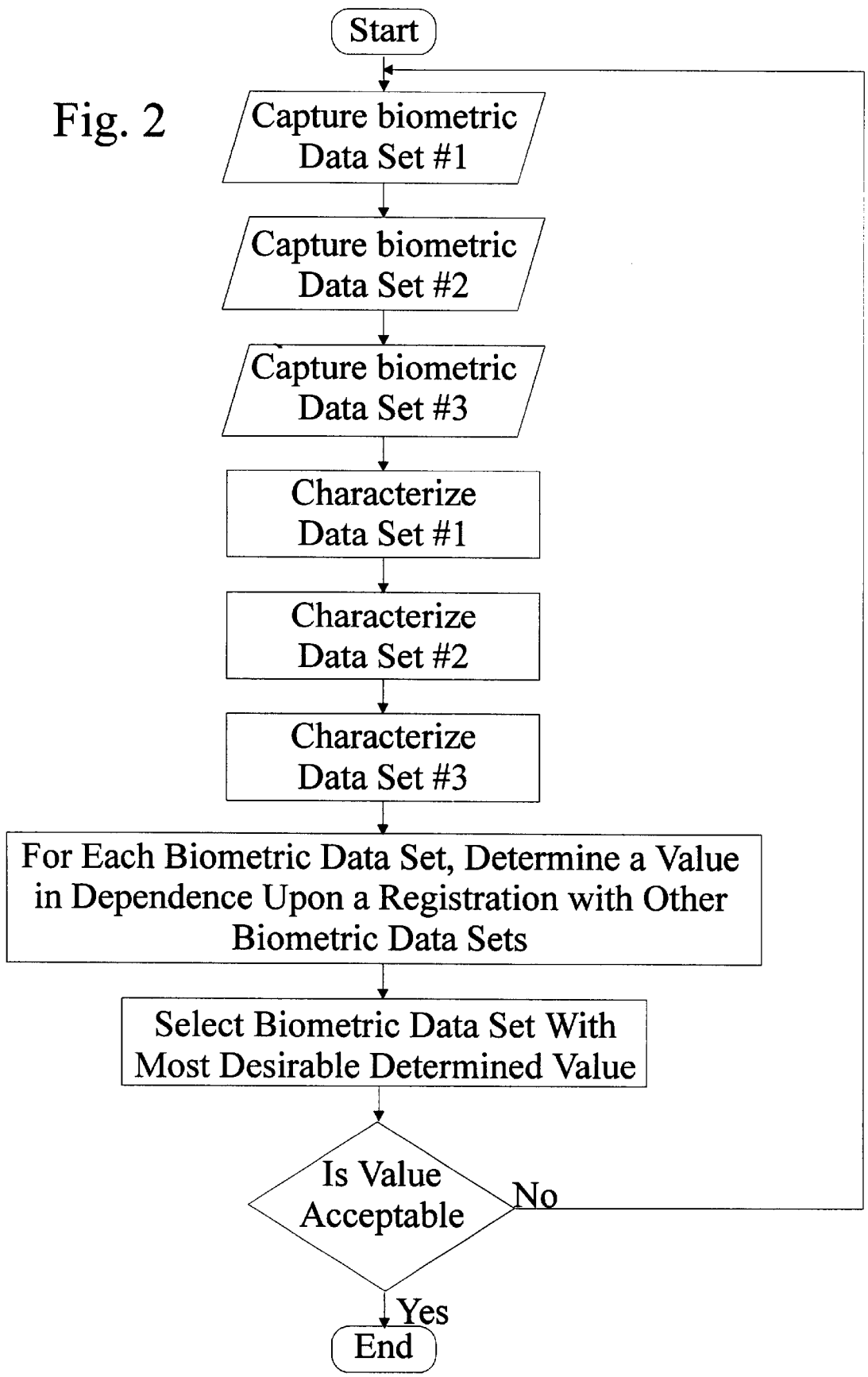
FIG. 2 is a flow diagram of a method of selecting a biometric template requiring 3 different biometric data sets in accordance with the invention.

Referring to FIG. 2 a flow chart of a method according to the present invention is shown. Three instances of biometric information in the form of finger prints are captured. As shown in the flow diagram, each instance is captured individually. Preferably all instances are captured in such a way as to simulate normal use. For example, when using a fingerprint sensor for unlocking a door, a person steps up to the door and presses their finger tip against the sensor. The person then steps away from the door and approaches the door from a second different angle. In this way, the fingerprints imaged by the sensor will better reflect a variety of possible fingerprints from a same user during normal operation and each captured image is independent, excepting the relation to a known fingertip.

Preferably, an operator ensures that each image is a "good fingerprint" prior to storing the image for characterization. Operator skill is not required when using the method of this invention, but may result in an improved template.

Each fingerprint is then characterized. Fingerprint characterization is well known and can involve many aspects of fingerprint analysis. The analysis of fingerprints is discussed in the following references, which are hereby incorporated by reference:

Xiao Qinghan and Bian Zhaoqi: An approach to Fingerprint Identification By Using the Attributes of Feature Lines of Fingerprint," IEEE Pattern Recognition, pp 663, 1986 C. B. Shelman, "Fingerprint Classification—Theory and Application," Proc. 76 Carnahan Conference on Electronic Crime Countermeasures, 1976.

Feri Pernus, Stanko Kovacic, and Ludvik Gyergyek, "Minutaie Based Fingerprint Registration," IEEE Pattern Recognition, pp 1380, 1980.

J. A. Ratkovic, F. W. Blackwell, and H. H. Bailey, "Concepts for a Next Generation Automated Fingerprint System," Proc. 78 Carnahan Conference on Electronic Crime Countermeasures, 1978.

K. Millard, "An approach to the Automatic Retrieval of Latent Fingerprints," Proc. 75 Carnahan Conference on Electronic Crime Countermeasures, 1975.

Moayer and K. S. Fu, "A Syntactic Approach to Fingerprint Pattern Recognition," Memo Np. 73-18, Purdue University, School of Electrical Engineering, 1973.

Wegstein, *An Automated Fingerprint Identification System*, NBS special publication, U.S. Department of Commerce/National Bureau of Standards, ISSN 0083-1883; no. 500-89, 1982.

Moenssens, Andre A., *Fingerprint Techniques*, Chilton Book Co., 1971.

Wegstein and J. F. Rafferty, *The LX39 Latent Fingerprint Matcher*, NBS special publication, U.S. Department of Commerce/National Bureau of Standards; no. 500-36, 1978.

Using the method of the present invention, a same characterization method is employed in characterizing each fingerprint. This allows for comparisons between characterized images. Alternatively, a series of characterizations are performed on each fingerprint to determine a best fingerprint from which to select the template and a best characterization for the template. Use of multiple characterizations increases the overhead required to characterize a fingerprint during normal use. It will be apparent to those of skill in the art that when multiple characterizations are employed, only similarly characterized fingerprints are compared. The remainder of this description assumes the use of only one form of characterization.

Each characterized image is selected, one at a time, and all other characterized images are registered against the selected characterized image. The selected characterized image acts as a template and the remaining characterized images act as user input biometric information. This results in six registrations. For each characterized image (serving as a template) a score is achieved. The score is based on the correlation between the characterized image (as template) and the other characterized images. The six registrations produce six different scores, two for each characterized image, which are compared. Alternatively, the scores for each characterized image, as template are added or averaged. The characterized image with the most desirable score(s) is selected to be the template. The score(s) is(are) then compared to a threshold value to determine suitability. When suitable, the image and the characterized image are stored and form the biometric information registration template. Alternatively, only the characterized image is stored. When the scores are not suitable, the characterized images are discarded and the method is followed again. Alternatively, only some characterized images are discarded and others are stored; the method is reapplied capturing only as many new images as are necessary in order to select a template.

Figure 3:
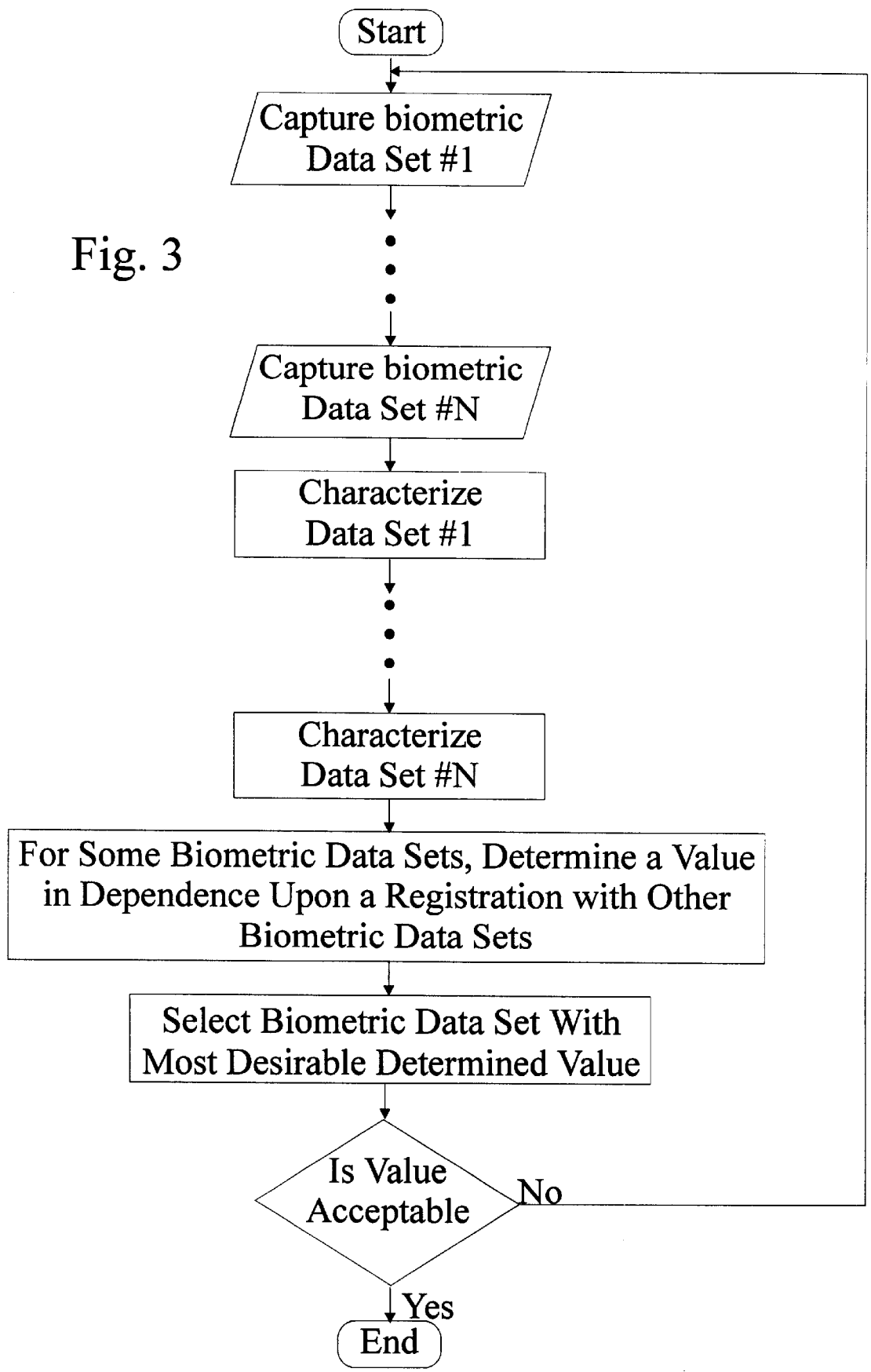
FIG. 3 is a flow diagram of a further method of selecting a biometric template requiring n biometric data sets.

In an alternative embodiment shown in FIG. 3, n instances of biometric information in the form of fingerprints are captured. Preferably, the captured images are independent as described above. Each image is characterized to produce a characterized image. At least some of the characterized images are selected. Against each of the characterized images selected, some other characterized images are registered. Should all characterized images be selected and compared against all other images, the number of resulting comparisons is (n) (n−1). For each registration, a resulting score is associated with the selected characterized image. The scores associated with each selected characterized image are compared and a characterized image with a most desirable set of scores is identified. The scores of the identified characterized image are verified against a threshold value to ensure that the identified characterized image is acceptable and the identified characterized image and the associated image are stored as a template. Alternatively, only the identified characterized image is stored as a template.

Alternatively, n instances of biometric information in the form of fingerprints are captured as shown in FIG. 3 and m further instances of biometric information in the form of fingerprints are provided. Preferably, the further images are selected to ensure a selected biometric template is unlikely to result in false registrations. The selection of the m instances is based on false authorizations that have occurred with some templates. Alternatively, the selection of the m instances is based on the characterization of the n images. Alternatively, the selection of the m instances is based on a random selection. Against each of the characterized images from the n instances, some other characterized images are registered, as are characterized images from the m instances. For each registration, a resulting score is associated with the selected characterized image. Scores indicative of similarities are desirable for registrations with characterized images from the n instances. Scores indicative of differences are desirable for characterized images from the m instances. The scores associated with each selected characterized image are compared and a characterized image with a most desirable set of scores is identified. Desirability of a set of scores is dependent on a predetermined level of security and on an application in which biometric identification is being used. The scores of the identified characterized image are verified against a threshold value to ensure that the identified characterized image is an acceptable template. Preferably, the template results in no authorization of instances from the m instances.

Preferably, the same characterized images are registered against each template. Further preferably, the scores are added or averaged.

Alternatively, the characterized image is modified prior to storing it. The modifications include removing features that failed to match similar features in at least some of the other characterized images. In this way, false features are reduced and improved registration results.

Most biometric identification systems work most effectively when users provide similar biometric input information each time they access a system. False rejections often result from inexperienced users of a biometric input device and more specifically from poor presentation of biometric information.

Figure 4:
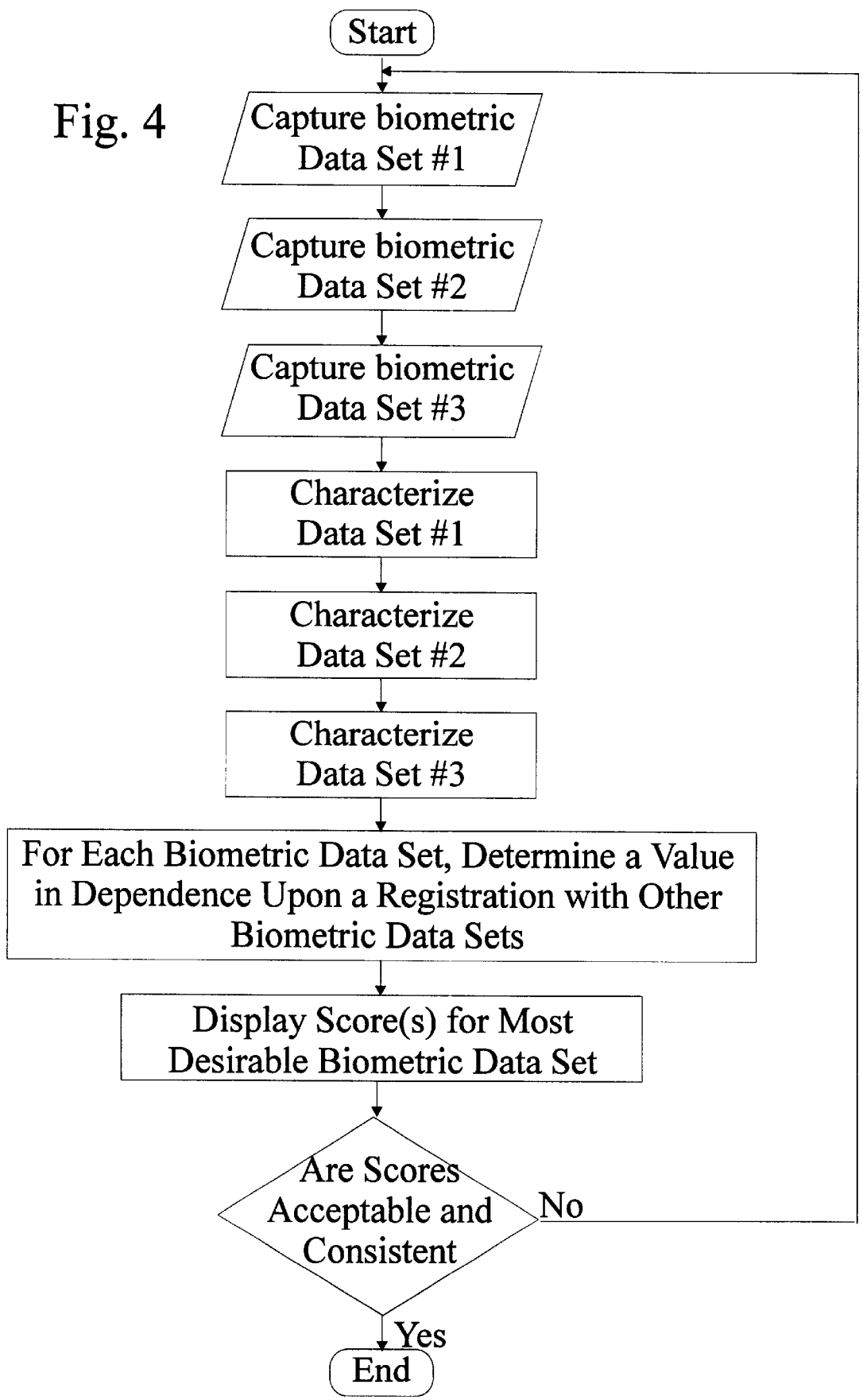
FIG. 4 is a flow diagram of a method of training users of a biometric input system according to the invention.

Referring to FIG. 4, a further use of a method according to this invention is automated training of users of biometric identification systems. A user provides a plurality of biometric input samples to a system. The system selects a sample as a template according to the present invention and reports on the resulting selected template and the resulting score(s). A first sample is discarded and replaced by a new sample. This is repeated for several trials until the template and the score(s) are substantially similar between trials. Given that the score exceeds a predetermined threshold, it is likely that the user is providing biometric input information to the system that is useable for user identification.

In using biometric information in the form of fingerprint images for user identification, false registration is a great concern. Often, false registration is a function of the biometric information and not an "error" on the part of an identification system. Two different users may share many common features in their biometric information, and therefore, each may register as the other. In selecting templates, it would be advantageous to reduce false registration as much as possible.

Figure 5:
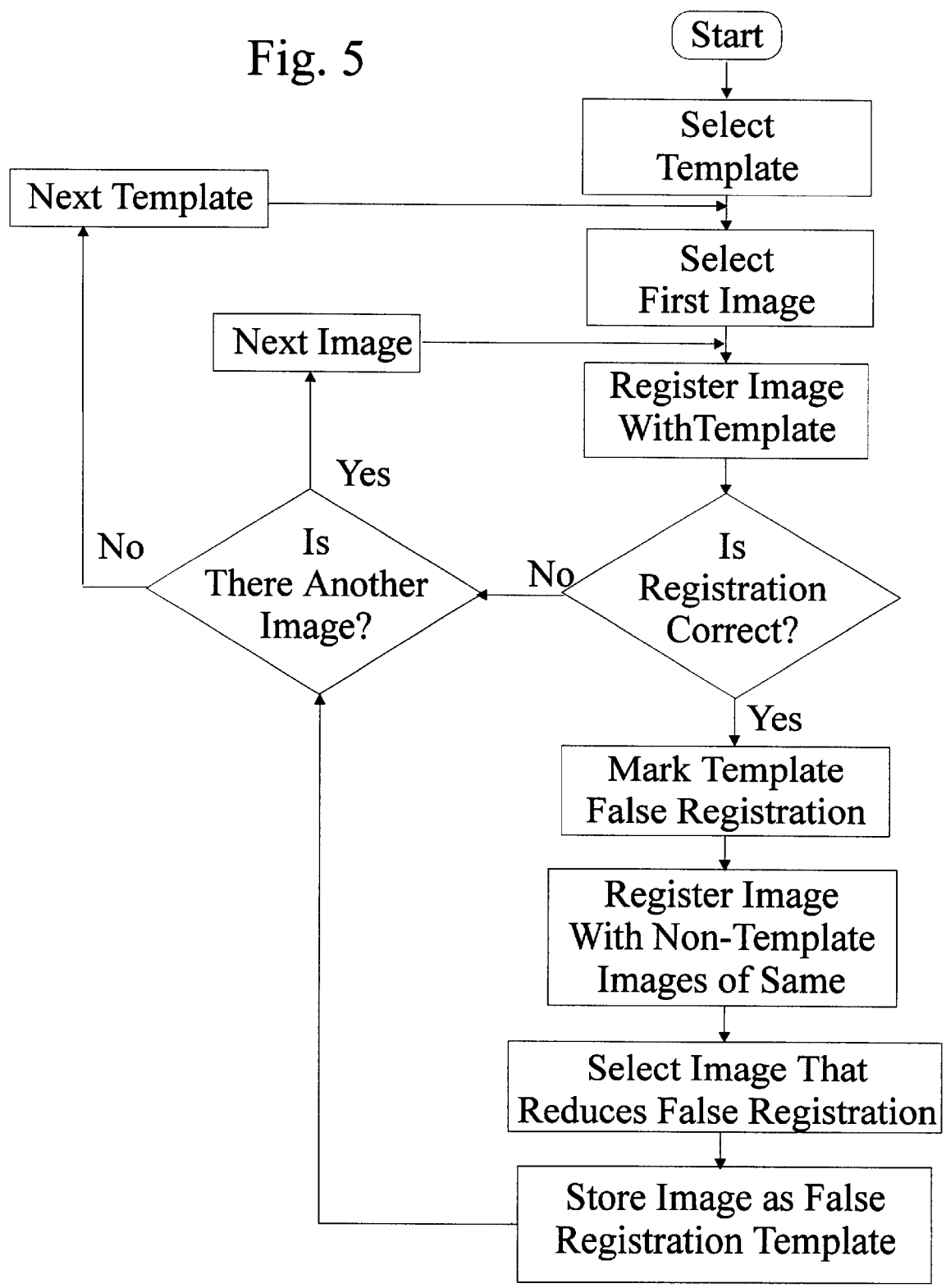
FIG. 5 is a flow diagram of a method reducing false acceptance (incorrect registration) of users of a biometric identification system according to the invention.

Referring to FIG. 5, a method of using the present invention for reducing false registration is presented. Templates are selected according to a known method of selecting same. A plurality of images are captured for each individual having a template. The images are each characterized and their characterizations are stored. Each image is registered against every template to identify potential false acceptance. For large systems, such a task is very time consuming and would be best executed as a background task. When a possible false registration is identified, a further template is selected (from the images and characterized images) to distinguish between correct and false registration. An identifier of the further template is stored with the original template in a hierarchical fashion. The identifier, for example, is in the form of an identification of the biometric information source. Optionally, information relating to the template identified as having a potential for false registration is also stored. The task executes until all images have been registered against all templates. Thus, when an acceptance occurs, the system has information that none of a plurality potential false acceptances has occurred. The resulting reliability of the system is thereby improved. When a very large number of users are enrolled, such an improvement is statistically significant.

Figure 6:
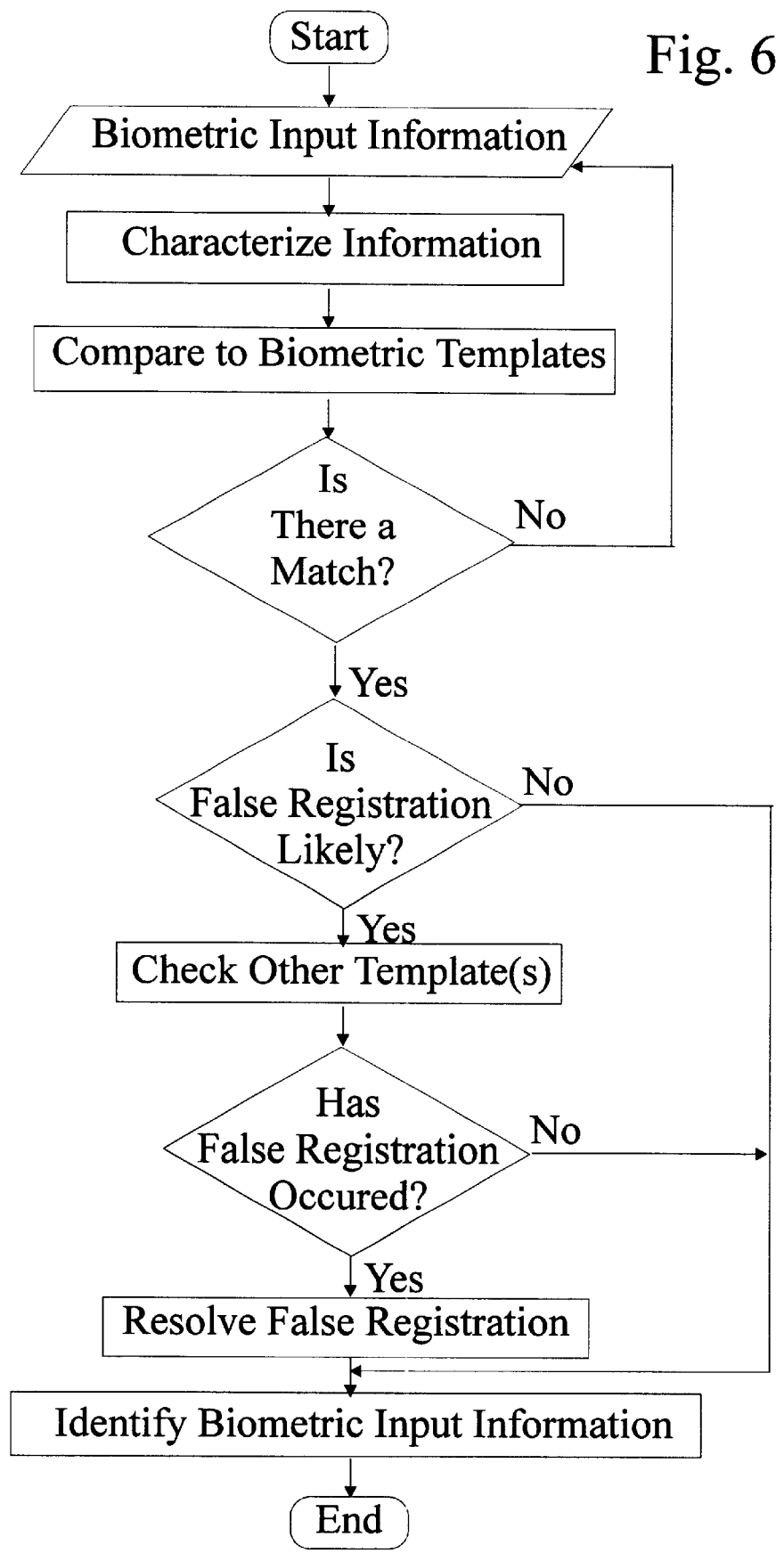
FIG. 6 is a flow diagram of a method of identifying the source of biometric input information in a system employing the method shown in the flow diagram of FIG. 5.

Referring to FIG. 6, a flow diagram of a method of identifying a user in dependence upon biometric input information is shown for a system employing a method of reducing false registration as described with reference to FIG. 5. A user provides biometric information in the form of a fingerprint image. The image is characterized. The characterized image is compared against templates to locate user information. When a registration occurs (a template is sufficiently similar to the biometric information provided) the system verifies that false registration is unlikely. When false registration is unlikely, registration is complete. When it is likely, the biometric information provided is compared to templates corresponding to each potential false registration associated with the registered template. When no further registration occurs, the registration process is complete.

When a further registration occurs, the registration process selects at least another template against which to verify the provided biometric information. This at least another template is stored associated with the templates against which registration has occurred. Selecting and storing the further template is described above with reference to FIG. 5. The further template improves the probability of distinguishing between each of the two potential false registrations identified.

Referring to FIG. 7, correlation results are shown for the fingerprints of FIG. 1a, FIG. 1b, and FIG. 1c. The results indicate that registering a fingerprint on a second fingerprint is not commutative. As such, the number of registrations required to select a template can not be reduced by registering each pair only one time. Of course, when a commutative registration algorithm is used, each pair only requires a single comparison.

Alternatively, the method is employed with retinal scanned biometric information. Further alternatively, the method is employed with palm prints. Further alternatively, the method is employed with non image biometric data such as voice prints.

Distinguishing Between Multiple User Identities

One of the problems with a finger print biometric is that a segment of the population can have temporary or permanent skin conditions which cause poor image quality on the scanning device which in turn causes them to experience high false rejection rates. By allowing candidates to use more than one finger during authentication, lower thresholds for authentication are combined in a way which confirms identities yet does not compromise the level of false acceptances for the system.

Thresholds from a set of distinct fingerprints from a candidate that would usually be rejected for being too insecure are combined according to this method to allow acceptance in dependence upon a plurality of biometric information samples. Thus a candidate lowers the chance of being falsely rejected by supplying multiple biometric information samples in the form of fingerprints for authentication.

Figure 8:
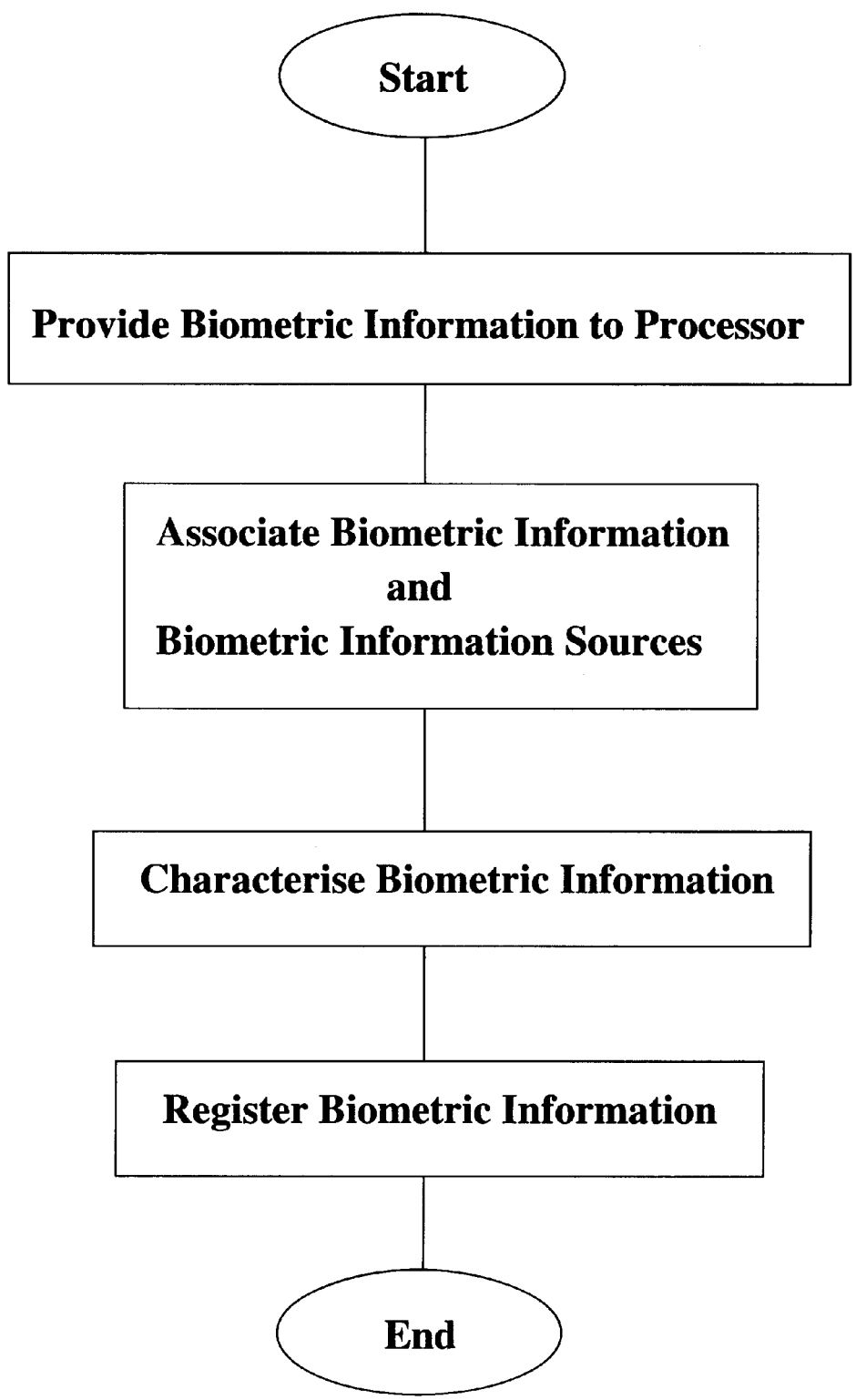
FIG. 8 is a flow diagram of a method of providing biometric information according to the invention.

Referring to FIG. 8, a flow diagram of an method of improving identification by using multiple biometric information samples is shown. Biometric information in the form of fingerprints is provided to a processor. According to the invention, a plurality of samples from at least two biometric information sources is provided. These samples are in the form of fingerprints, palm prints, voice samples, retinal scans, or other biometric information samples.

Requiring an individual to enter biometric information samples from at least two biometric information sources allows for improved registration results and reduced false acceptance. For example, some individuals are known to be commonly falsely accepted or identified as taught above. The false acceptance taught above is a result of similarities between biometric information samples from a biometric information source of a registered individual and from a biometric information source of another registered individual. These similarities are often only present for a specific similar biometric information source such as a left index finger or a right thumb. The provision and registration of two biometric information samples, reduces likelihood of similarity because, where before similarity of a single biometric information source resulted in false acceptance, now similarity in two different sources is unlikely. Therefore, requiring a minimum of two biometric information sources reduces a likelihood of false acceptance. The use of a plurality of varied biometric information sources in the form of retinal scans, voice prints, finger prints, palm prints, toe prints, etc. further reduces probability of false registration; it is unlikely that the varied biometric information from two individuals is similar.

Similarly, requiring an individual to enter biometric information samples from at least two biometric information sources reduces the probability of false rejection. As the likelihood of false acceptance decreases, a lower threshold for acceptance becomes acceptable. Both false rejection and false acceptance are thereby reduced or, in other words, probability of accurate identification is improved. It is common, in building access systems to maintain a database of individuals within the building and to deny those individuals access to the building a second time. In accordance with one embodiment of the present invention, decreasing false rejection is achieved by allowing a system to distinguish between users currently within and those currently outside a building even when biometric information from one or more biometric information sources is similar.

Each biometric information sample is associated with a biometric information source in the form of a fingertip, a retina, a voice, a palm, etc. The association allows for comparison between the biometric information sample and a template associated with the biometric information source. When an individual's identity is provided to the processor or is known, the biometric information sample is only compared to a single template associated with the biometric information source. Alternatively, the biometric information sample is compared against a plurality of templates. Comparing biometric information samples is often referred to as registering the biometric information samples. Many methods are known for performing the registration. Commonly, the biometric information sample is characterized according to a method specific to the template. The template and the characterized biometric information sample are compared to determine a registration value. The registration value is then used to determine identification; to provide access to a system or structure; to log access; to monitor use; for billing; or for other purposes.

When an individual's alleged identity is not provided to the processor or known to the processor, the characterized biometric information is registered against templates stored in a database of templates in order to locate those registrations which are indicative of a predetermined characteristic. The characteristic is often identity but other characteristics are also known. Because a plurality of biometric information samples is provided, the registration against templates is for locating a plurality of templates that are indicative of a predetermined characteristic. When the characteristic is identity, the templates are from a same individual and the registration process tries to locate a set of templates that registers with the characterized biometric information samples resulting in a set of values indicative of accurate identification.

Figure 8B:
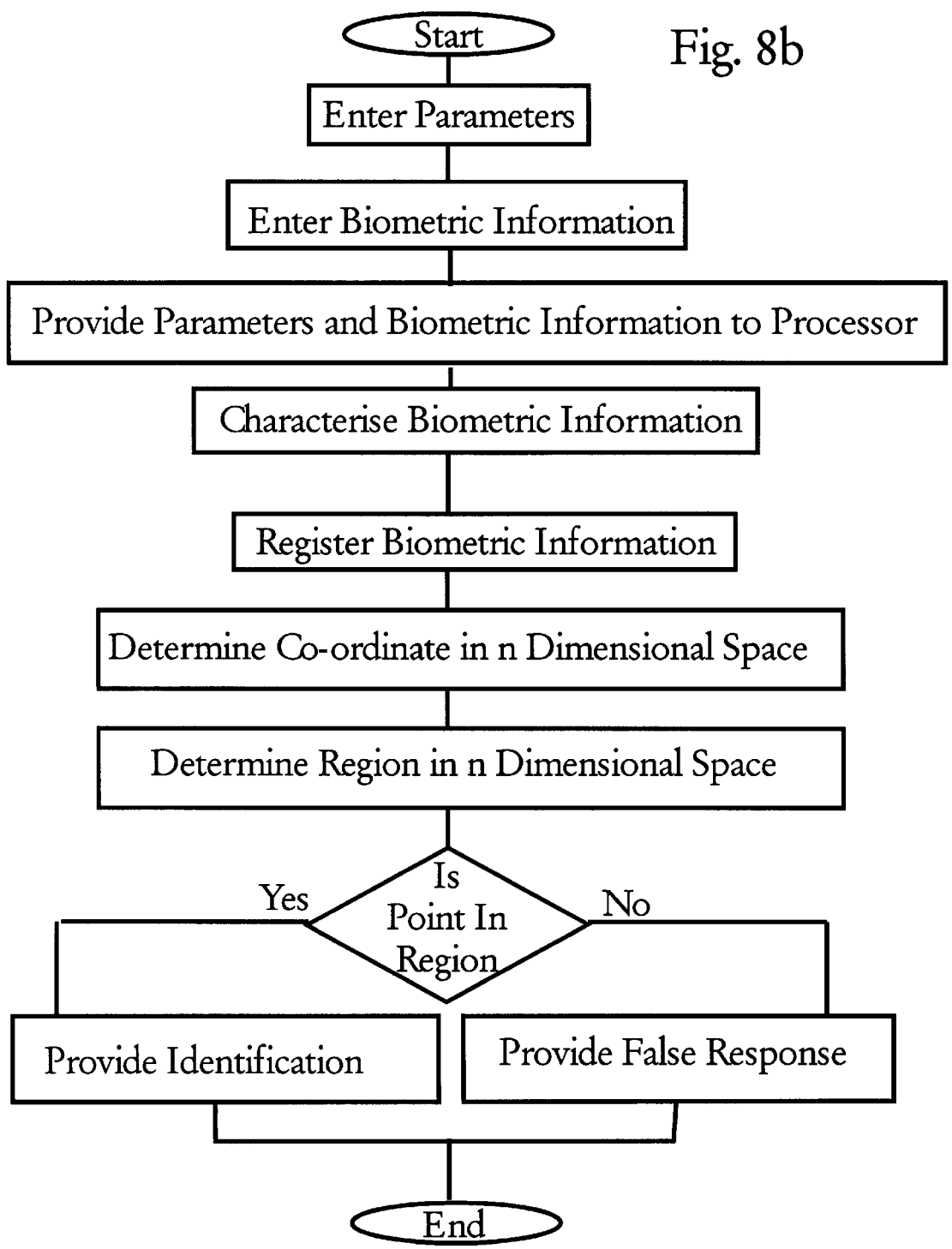
FIG. 8b is a flow diagram of a method of providing biometric information and identifying a user in dependence thereon according to the invention.

Referring to FIG. 8b, a flow diagram of an embodiment of the invention for identifying an individual is shown. An individual seeking authentication by a user authorization system is presented with a parameter entry means. Parameter entry means are well known in the art of computer science. Some examples of parameter entry means include dedicated switches; software for execution on a processor and for providing an individual with means for selecting or customizing parameters in the form of prompts, a command line, or a graphical user interface; cards or other storage means for provision to a device capable of reading stored parameters and providing them to a processor; wireless data entry; and voice data entry systems.

Using the parameter entry means, the individual determines biometric information sample parameters. The parameters are selected from a known group of available parameters. Examples of known groups of biometric information samples include (right index finger, left index finger, left thumb); (right index finger, voice); (retinal scan, voice); (left thumb, left middle finger); etc. Groupings reduce user entry requirements; however, groupings also reduce flexibility. Alternatively, parameters are entered when an individual selects from all available parameters in order to determine a group. For example, an individual is presented with a graphical display, as shown in FIG. 9, of biometric information sources in the form of fingers 11 and selects a number of samples for each source. When a voice recognition system is incorporated into the user authorization system, an icon 12 representing voice is also displayed. When a retinal scanning system is incorporated, an icon 13 representing the retinal scan is displayed. Other icons are displayed when corresponding biometric identification systems are present. The individual enters parameters in the form of identifying biometric information sources and for each source a quantity of samples being provided.

Preferably a minimum set of requirements exist which, though flexible, ensures sufficient levels of security. Requiring each individual to enter information from a minimum number of biometric information sources and perhaps a maximum number of samples from a same biometric information source allows for maintenance of at least a predetermined security level.

Once the parameters have been entered, the individual enters biometric information into the system in accordance with the parameters. Preferably, the parameters once selected are sent to a processor for analysis and the individual is prompted to enter each biometric information sample. Alternatively, the parameters and the biometric information are sent to a processor together.

The biometric information provided by the individual is related to the parameters selected. For example, referring to FIG. 9a, when the individual selects left ring finger once, right thumb once, and right index finger once, the individual then provides a sample of a fingerprint from the left ring finger, a fingerprint sample from the right thumb and a fingerprint sample from the right index finger. Prompting, shown in FIG. 9b, allows the individual to select very complicated sets of biometric information sources or to select from predetermined sets without remembering the parameters and/or an order for the parameters.

A biometric input means in the form of a live fingerprint scanning device is used to collect the biometric information in the form of images of fingerprints of the individual which are entered in a predetermined order. Each biometric information sample is identified. When the individual is prompted for a biometric information sample, the processor labels the samples. Alternatively, an individual enters parameters and biometric information simultaneously by entering a biometric information sample and identifying the sample as, for example, a specific fingerprint or a voice sample. Optionally, the individual is provided with a means of reviewing and accepting or discarding biometric information samples.

The authentication procedure determines an independent sequence of comparison scores from the input provided by the candidate. This sequence is considered to be a point, hereinafter referred to as P, in n-dimensional vector space, $R^n$. A threshold function $h_\alpha: R^n \to R$ is used to determine whether or not the point belongs to a set $U_\alpha$ by $P \in U_\alpha \Leftrightarrow h_\alpha(P) \geq C_\alpha$. The identity of the individual is confirmed if and only if $P \in U_\alpha$.

Since the sequence is independent, it is also applicable piecewise through evaluation of a single biometric information sample and then, should the first sample provide insufficient likelihood of an accurate identification, provision and evaluation of subsequent biometric information samples follows. Further, the information resulting from the first evaluation is useful in assessing which biometric information samples will best distinguish between known individuals.

The biometric information sample identifiers are used to uniquely identify the input samples. Let I be the set of input images, $I=\{I_i | 1 \leq i \leq N\}$. For $I_i \in I$, let $Id_i$ be the identifier of an image, let $T_i$ be the characterization or template of the image, and let $T_i^*$ be the reference template of the image.

Define the equivalence relation ≡, on the set I by $$I_i \equiv I_j \Leftrightarrow Id_i = Id_j;$$

The sets $$H_k = \{I_i | I_i \equiv I_k\}$$

are equivalence classes that partition the set of input images into sets of images that belong to a same finger tip. There are n of these classes where $1 \leq n \leq N$.

When τ is a set of all fingerprint templates generated by a given characterization algorithm and score: $\tau \times \tau \to R$ is the measure generated by an associated matching algorithm, then we can construct a set of class representative, $I_R$, which contains one representative for each $H_k$:

$$I_R = \{I_j \in H_k | score(T_j, T_j^*) = \max\{score(T_i, T_i^*)\}, 1 \leq k \leq N\}$$

$$I_i \in H_k$$

The set $I_R \subseteq I$, is then a set of images of the distinct input fingerprints that achieve the highest scores. Alternatively, multiple samples of a same fingerprint are considered. For each $I_i \in I_R$, $1 \leq i \leq n$, let $x_i = score(T_i, T_i^*)$ correspond to scores from the matching algorithm. Any ordering of these scores is a point in the vector space $R^n$, simply by constructing the n-tuple $(x_1, x_2, \ldots, x_n) = P$.

Essentially, as shown in FIG. 8, once a set of parameters is selected, a graphical distribution of identifications is achievable in n-dimensions. The biometric information samples are provided to a processor. Registration is conducted against known templates in dependence upon the selected parameters. Once registration is complete, a single point is determined having coordinates equal to each of at least some of the registration results. Alternatively, the point has coordinates determined in dependence upon the registration results but not equal thereto. Plotting the point results in a point plotted in n-dimensional space. The processor then determines a probability distribution for the selected parameters. Alternatively, this is performed prior to the registration process for biometric information samples. Further alternatively, the probability distributions are determined or approximated in advance and stored in non-volatile memory.

Given an n-dimensional plot defined by a boundary function and a single point, a comparison determines whether or not the point falls below or above the function and optionally within or outside other known ranges. Stated differently, the point is analyzed to determine whether it falls within a suitable region wherein region is defined as an n-dimensional region having at least some known boundaries. When the point falls within a predetermined or suitable region, the individual is identified. When the point falls outside the predetermined or suitable region, the individual is not identified. The identification system then responds accordingly. Responses in the form of locking an individual out, denying an individual access, logging an attempted entry by an unidentified individual, etc. are well known and are beyond the scope of the present invention.

Figure 10:
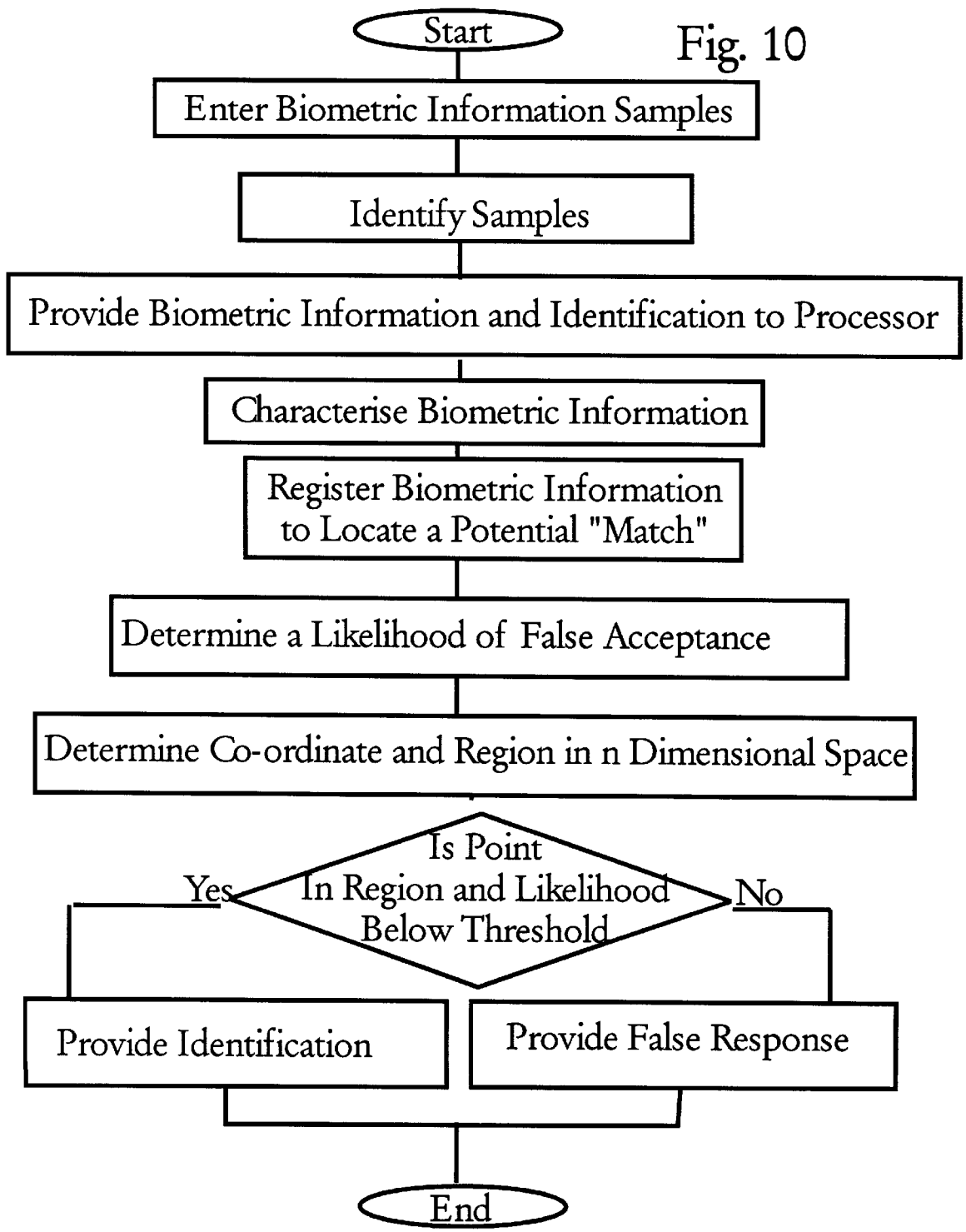
FIG. 10 is a flow diagram of another method of providing biometric information and identifying a user in dependence thereon according to the invention.

Referring to FIG. 10, a simplified flow diagram of another embodiment for user identification is shown. Biometric information samples are provided to a processor and associated with their biometric information sources in the form of finger tips, eyes, palm, or voice. The biometric information samples and the associated information are provided to a processor. The processor characterises the biometric information samples and registers them against templates. When the individual's alleged identification is known, registration is performed against templates associated with the individual and associated with same biometric information sources. Identification of an individual is conducted in a fashion similar to that set out for FIG. 8b above. Once a user is identified, data relating to the user and to a likelihood of false acceptance is read. The identification is used with the data to determine whether further biometric information samples are required. For example, when the data comprises identities of other users whose biometric information is similar to that of the identified user, a comparison of templates of each of the other users and the characterised biometric information indicates whether any of the other users is also a potential match. In an alternative embodiment, with each user identity is included a similarity indication to allow a determination of whether the identification with its known likelihood poses a significant possibility of false identification for said user identity. Thus, only user identities having a likelihood of being falsely accepted are verified. Of course, depending on the amount of data relating to each possible error in identification, different responses occur. Essentially, it is significant that information relating to errors in identification that have or could occur is stored with an identification and is then used to improve the identification results.

In an embodiment, when a system in the form of a door access system has limited input and output capabilities, each biometric information sample is verified against a pertinent portion of the database of biometric templates. For access, for example, the pertinent portion comprises all individuals outside the secured area secured by the door. Upon provision of a first sample, the pertinent portion of the database is restricted to those individuals with a likelihood of having provided the first sample. This portion is likely substantially smaller than the previous pertinent portion. When the current pertinent portion comprises more than one individual or when the individual is identified with a likelihood that is insufficient for maintaining system security, more samples are required.

In use of a doorway system, three LEDs can provide sufficient information for use of the system. A green LED indicates identification, a red LED indicates rejection and a yellow LED prompts for a further biometric information sample. Of course, the selection of LED colours and the design of a user interface are in accordance with a particular application. Even for a doorway, any of a number of user interface designs is compatible with the present invention.

Figure 11:
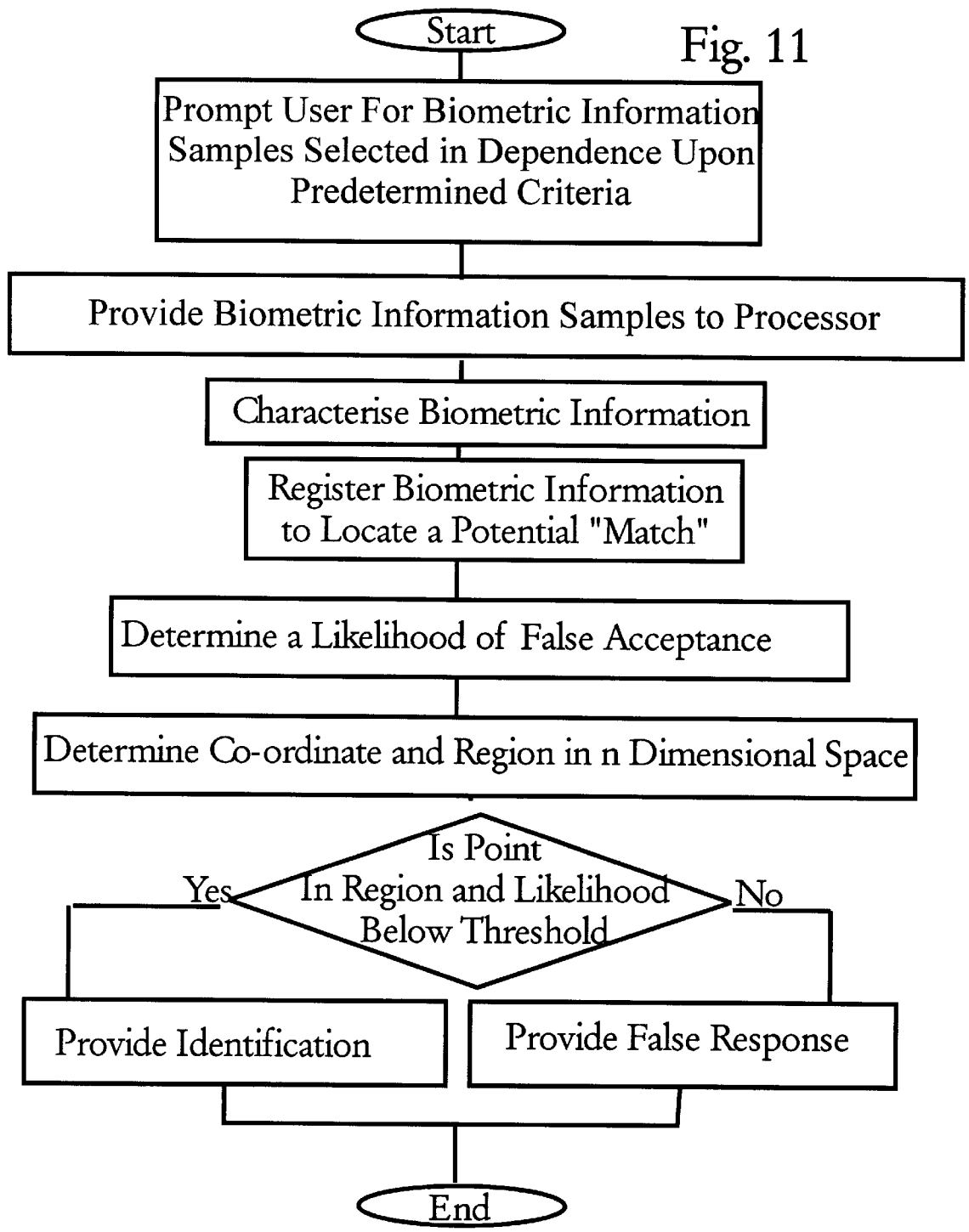
FIG. 11 is a flow diagram of another method of providing biometric information and identifying a user in dependence thereon according to the invention.

Referring to FIG. 11, a simplified flow diagram of another method according to the invention is shown. A processor prompts an individual for biometric information samples associated with biometric information sources selected by the processor according to a predetermined algorithm. The predetermined algorithm uses data within the biometric information database to determine those individuals who are potentially misidentified with better than a predetermined likelihood. Samples are then selected to avoid misidentification as much as possible. Of course, statistical analysis of the database may provide sufficient information to determine a set of biometric information samples that is sufficient for all enrolled individuals. When the set is sufficiently small, its use may lend convenience and added security to the entire system. Optionally, the predetermined algorithm selects the biometric information sources in dependence upon a likely identity of the user. The biometric information samples are provided to the processor. The processor characterises the biometric information samples and registers them against templates. When the individual's alleged identification is known, registration is performed against templates associated with the same biometric information sources of the individual and against templates associated with those individuals who are potentially misidentified with better than a predetermined likelihood.

Figure 12:
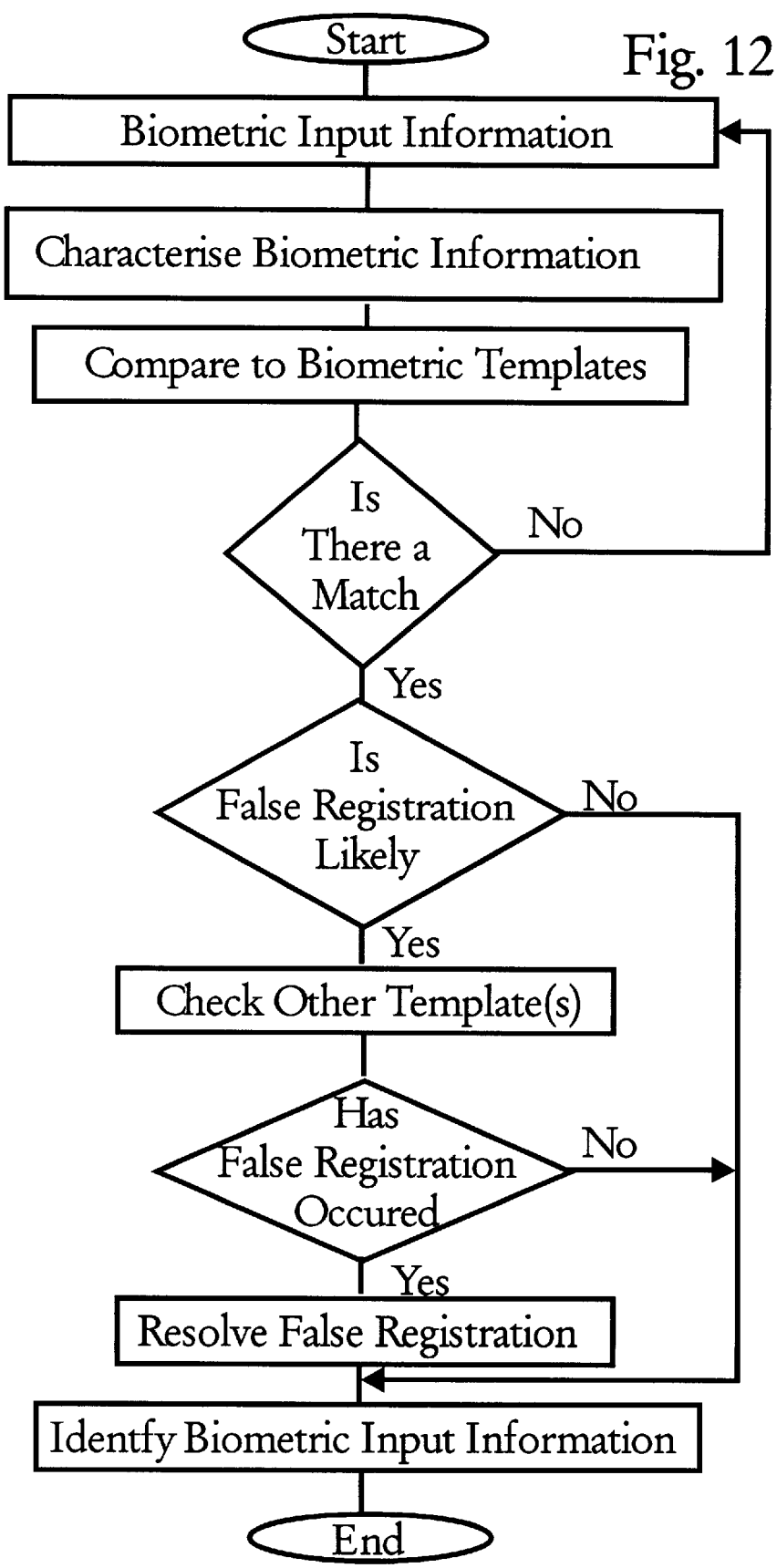
FIG. 12 is a flow diagram of another method of providing biometric information and identifying a user in dependence thereon according to the invention.

Referring to FIG. 12, a simplified flow diagram of another method according to the invention is shown. Biometric information samples and associated parameters are provided to a processor. The processor characterises the biometric information samples and registers them against templates. When the individual's alleged identification is known, registration is performed against templates associated with the individual and associated with same biometric information sources. Identification of an individual is performed by evaluating resulting values from the registration to determine, for those resulting values, a probability of false acceptance and false rejection. The probability of false acceptance is evaluated based on data stored in association with data relating to the individual, the stored data indicative of other individuals whose data is likely to register when the individual's data is in registration. The probability of false acceptance is further evaluated by comparisons with data associated with the other individuals. When the values are within predetermined limits for an acceptable value, identification is provided. When the value falls outside the predetermined limits identification is not provided.

Figure 13:
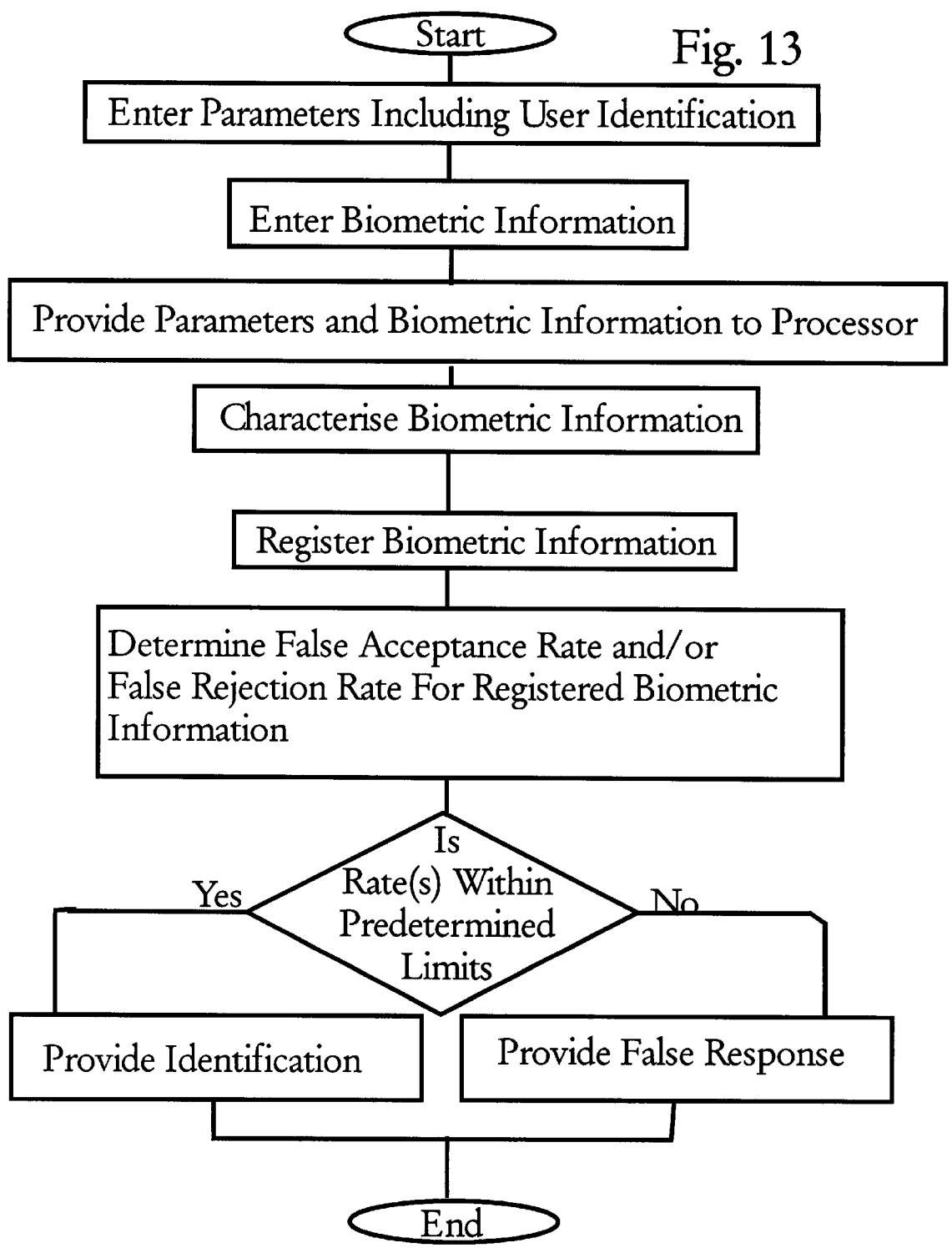
FIG. 13 is a flow diagram of another method of providing biometric information and identifying a user in dependence thereon according to the invention.

Referring to FIG. 13, a simplified flow diagram of another method according to the invention is shown. Biometric information samples and associated parameters including an alleged identification of the individual are provided to a processor. The processor characterises the biometric information samples and registers them against templates. When the individual's alleged identification is known, registration is performed against templates associated with the individual and associated with same biometric information sources. Identification of an individual is performed by evaluating resulting values from the registration to determine a probability, for those results, of false acceptance and false rejection. The probability of false acceptance is evaluated based on data stored in association with data relating to the individual indicative of other individuals whose data is likely to register when the individual's data is in registration and by further comparisons with data associated with the other individuals. When the value is within predetermined limits for an acceptable value, identification is provided. When the value falls outside the predetermined limits identification is not provided.

Figure 14:
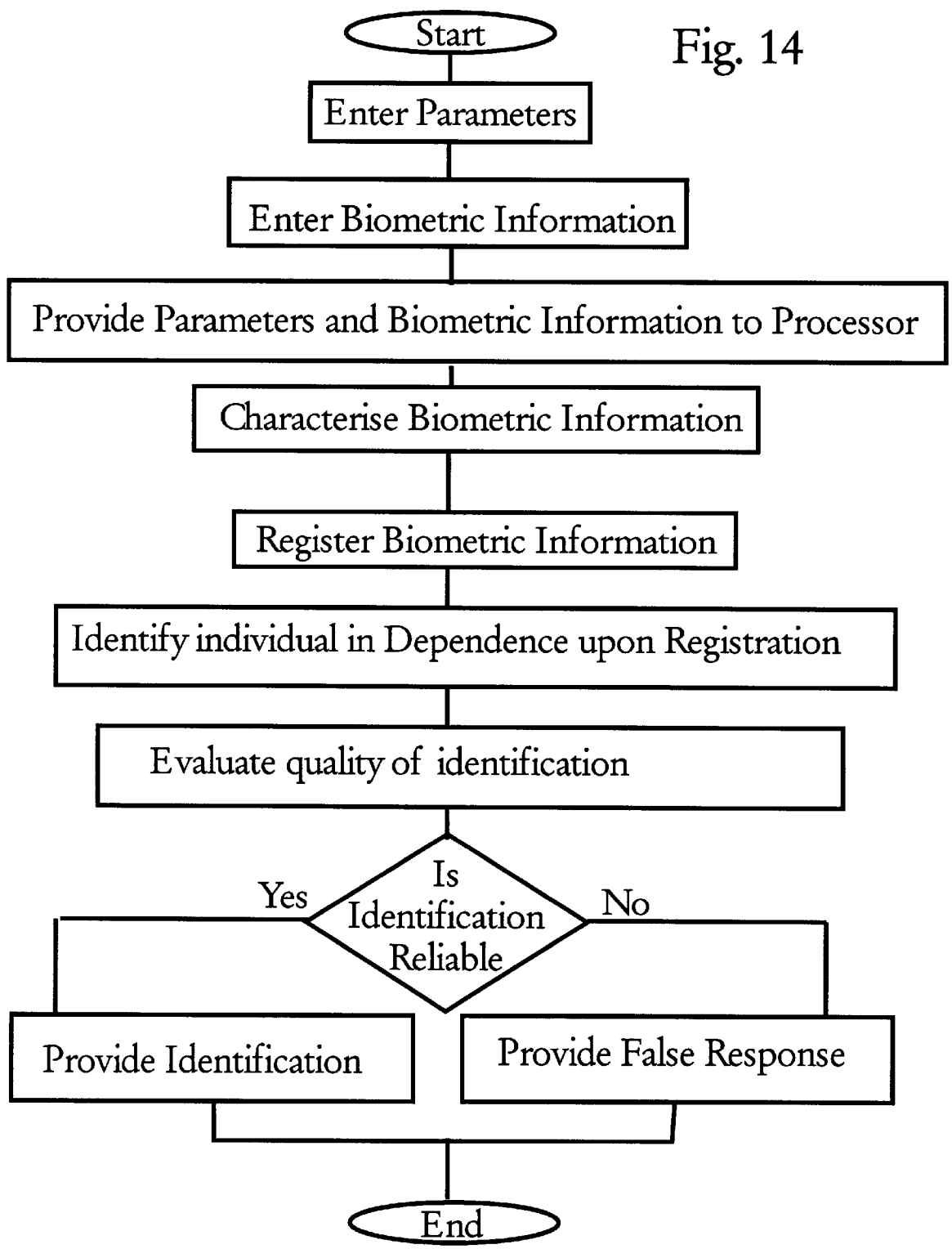
FIG. 14 is a flow diagram of another method of providing biometric information and identifying an individual in dependence thereon according to the invention.

Referring to FIG. 14, a simplified flow diagram of another method according to the invention is shown. Biometric information samples and associated parameters are provided to a processor. The processor characterises the biometric information samples and registers them against templates. When the individual's alleged identification is known, registration is performed against templates associated with the individual and associated with same biometric information sources. Identification of an individual is performed by evaluating resulting values from the registration to determine a quality of user identification. One aspect of the quality relates to identified potential for false acceptance. In accordance with the invention, this identified potential provides information indicative of other enrolled users who may also be accepted by a same biometric information sample and, therefore, by registering a current biometric information sample against templates associated with the other enrolled users, some false identifications are avoided. When the quality is within predetermined limits for an acceptable quality, identification is provided. When the value falls outside the predetermined limits identification is not provided.

Figure 15:
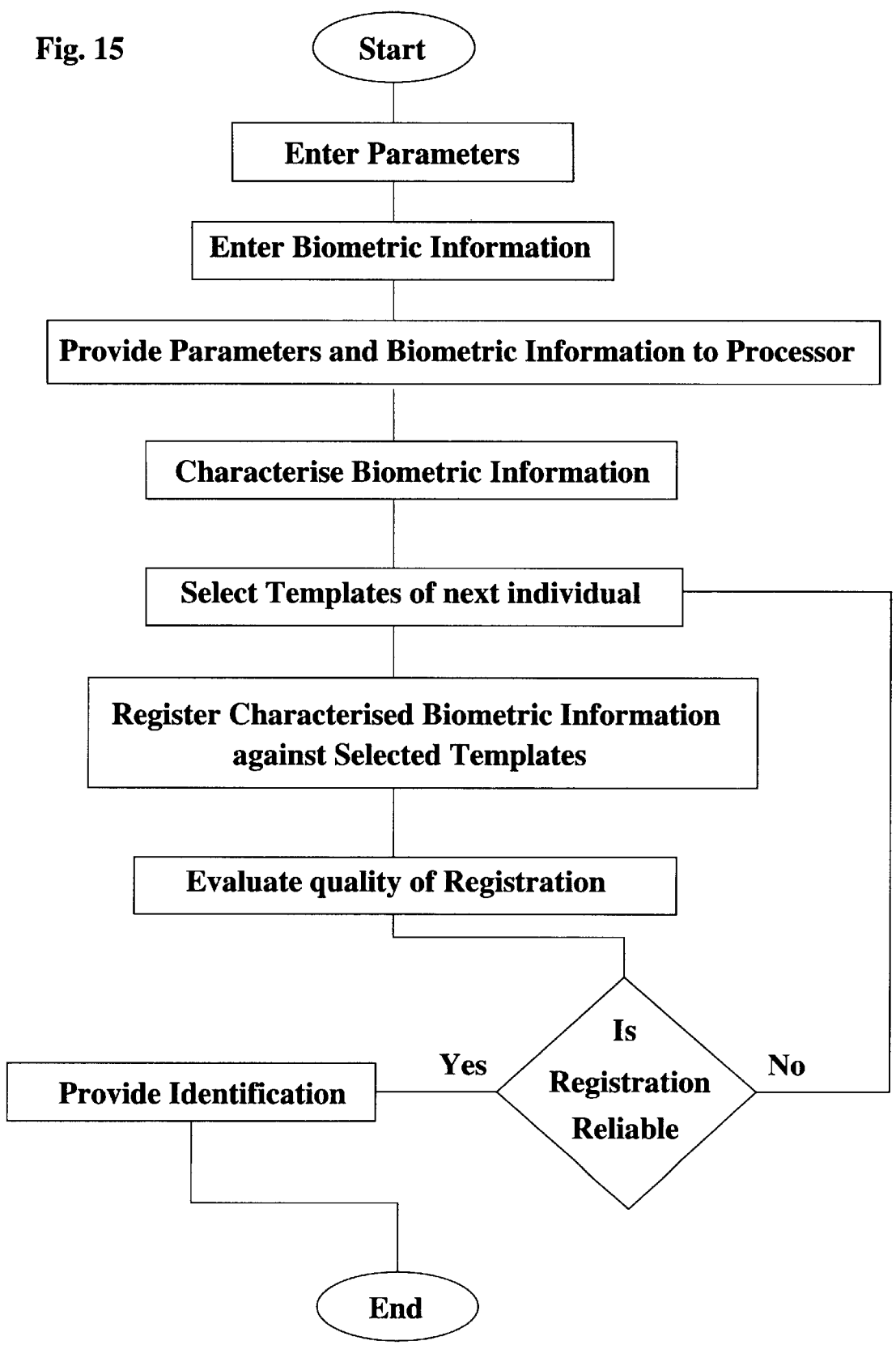
FIG. 15 is a flow diagram of another method of providing biometric information and identifying an individual in dependence thereon according to the invention.

Referring to FIG. 15, a simplified flow diagram of another method according to the invention is shown. Biometric information samples from an individual and associated parameters are provided to a processor. The processor characterises the biometric information samples and registers them against templates. A first set of templates associated with an individual and associated with same biometric information sources is selected. Registration of the biometric information samples is performed against the selected templates producing registration values. In dependence upon these values a quality of user identification is determined. Such a quality is similar to that described with reference to FIG. 14. When the quality is within predetermined limits for an acceptable quality, identification is provided. When the value falls outside the predetermined limits, identification is not provided and a next set of templates is selected. The selection of the next set is optionally performed in dependence upon a set of individuals that are likely to be identified according to the process. Optionally, once all sets of templates are exhausted, an indication of failure to identify is provided.

Figure 16:
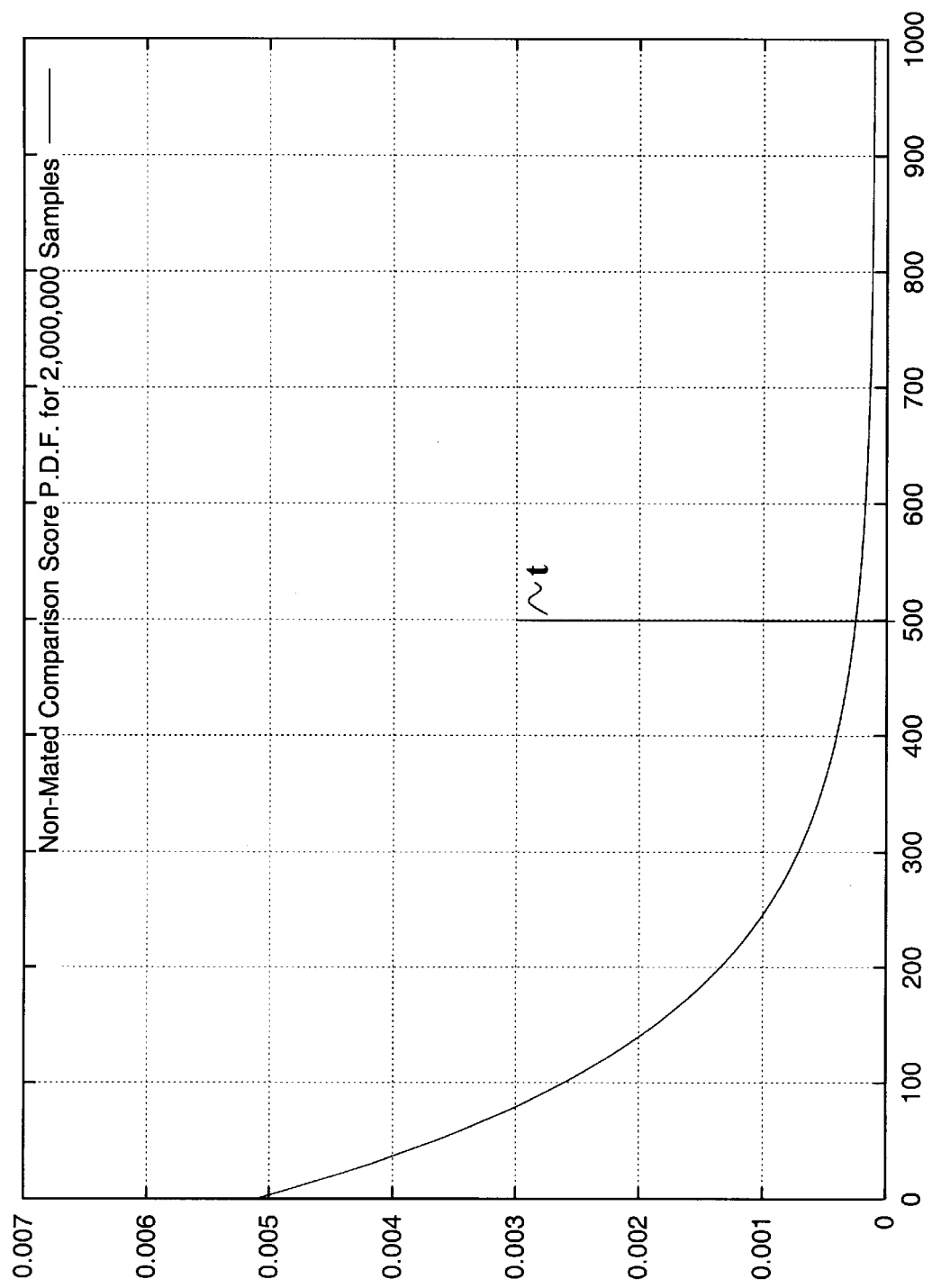
FIG. 16 is a probability distribution curve for individual identification using a biometric information sample.

Referring to FIG. 16, a two dimensional probability distribution is shown. The total area below the distribution curve is 1 unit area. Using such a curve, false acceptance or false registration is described. Most biometric information samples are easily characterized. The high initial point on the probability curve and the steep decent to an asymptotic curve approaching 0 shows this. The line t marks the cutoff for registration effectiveness. This is determined in dependence upon an algorithm chosen and upon system limitations such as processor speed, memory, and security requirements. The shaded region bounded by Y=0, X>t, and the probability curve represents false acceptances.

Figure 17:
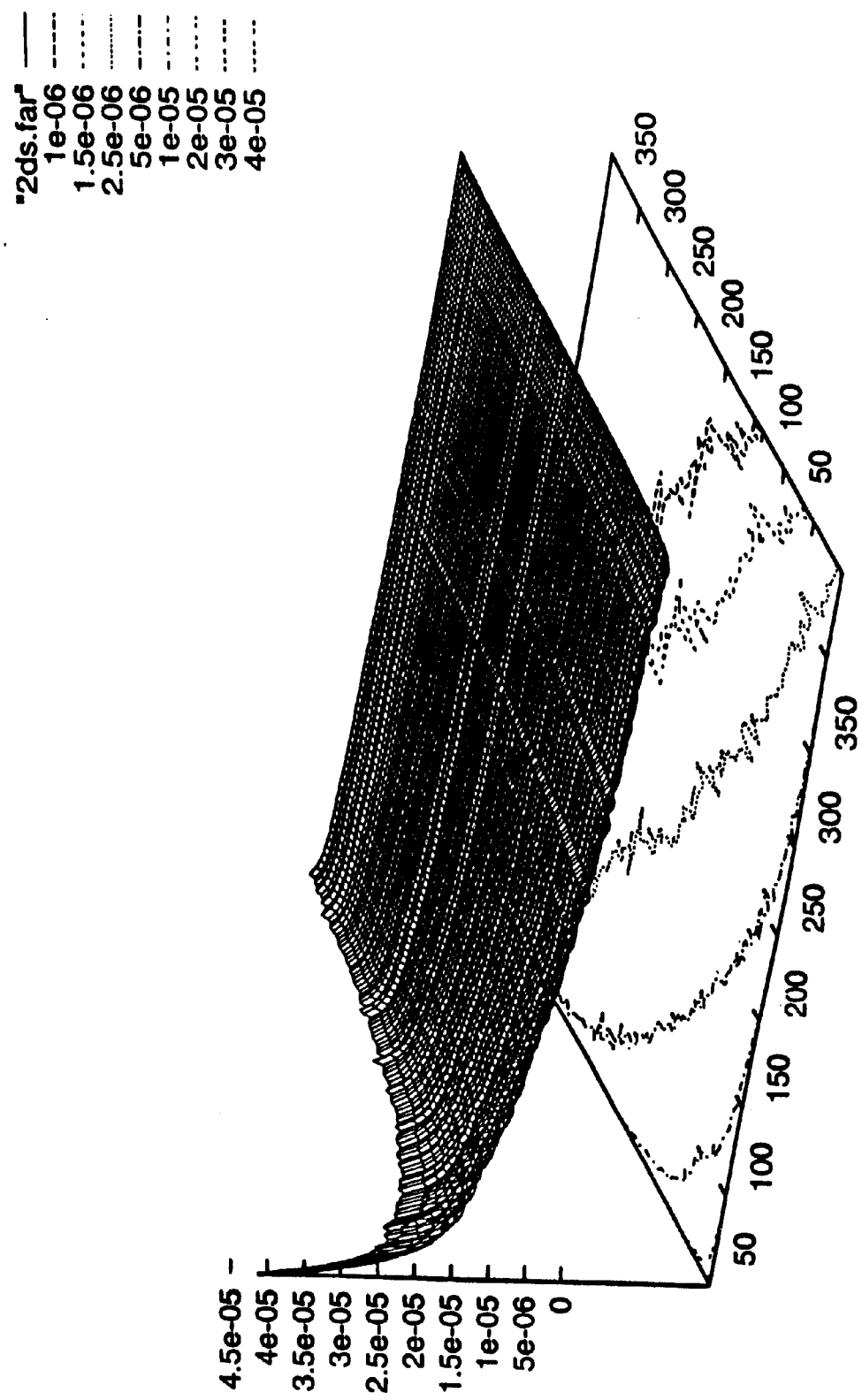
FIG. 17 is a two dimensional probability distribution surface for individual identification in dependence upon a plurality of biometric information samples.

Referring to FIG. 17, a truncated two dimensional probability distribution curve is shown. Now, false acceptance is represented by a region of three dimensional space having a volume of 1 or less units. Upon viewing the graph of actual data for fingerprint biometric information, it is apparent that the graph is symmetrical and that the graph extends toward infinity without reaching the plane z=0. Further, the diagonal center of the surface x=y is a minimum for a given x and y.

A plot showing an acceptance curve for registration is contained below the curve of FIG. 17. Here two parameters either from separate registrations or from a same biometric information sample registration are evaluated to determine a point. When the point falls below the line, the biometric information is not identified and correspondingly the individual is not identified. Alternatively, when the point falls within the shaded region, registration occurs. Extending this to a plurality of biometric information samples results in regions allowing for excellent registration of some samples with moderate registrations of other samples. Using a plurality of biometric information samples, allows equivalent registration algorithms to provide greatly enhanced security or Alternatively, allows faster and simpler registration algorithms to provide equivalent security.

In evaluating security of biometric authorization systems, false acceptance and false rejections are evaluated as a fraction of a user population. A security system is characterized as allowing 1 in 1,000 false acceptances or, alternatively, 1 in 1,000,000. Extending the graph of FIG. 18 to n dimensions, results in a different distribution for a region representing acceptance and, therefore, a match scores of a single biometric information sample that falls outside the shaded region of FIG. 17, when combined with several other similarly weak biometric information samples, is more likely to fall within an acceptable region. A reasonable correlation among several identifiers is a good indication of identity. Alternatively, using only a single biometric information sample, a low match score results in failure to authorize an individual. Likewise, a different individual entering a plurality of biometric information samples and trying to gain unauthorized access by, for example, posing as an authorized individual, is unlikely to match evenly across all samples and, whereas a single biometric information sample may match well, several will not. Further examination of an acceptance graph shows that excellent match scores of some samples reduce the necessary match scores for other samples for authorization to occur.

The probability density function is discussed below. Assume a probability density function, $f$, of non-match scores exists. That is, $$f:R \to [0, 1]$$

and $$\int_R f = 1$$

If $S=\{x|x=\text{score}(T_a, T_b)$, where $T_a$ and $T_b$ are characterizations of distinct fingerprints$\}$, then $f$ is 0 outside of S, and $$\int_S f = \int_R f = 1.$$

It should be noted that $x \in S \to x \geq 0$ since score is a measure. An n-dimensional probability density function, g for a sequence of non-match scores is constructed by:

$$g(P) = \prod_i^n f(x_i), \text{ for } P \in R^n$$

Since each $f(x_i) \leq 0$, then it follows that $g(P) \leq 0$ and that $$\int_R f = 1 \Rightarrow \int_{R^n} g = 1$$

For any subset $U \subseteq S^n$, the probability that a collection of n scores of non-matching fingerprints lies in U is given by:

$$\int_U g$$

Given an n-dimensional probability density function, g, a region, $U_\alpha \subseteq S^n$ is defined, bounded "below" by a function, $h_\alpha: R^n \to R$.

$$U_\alpha = \{P \in S^n | h_\alpha(P) \geq C_\alpha\}.$$

$C_\alpha$, a constant, is calculated such that:

$$\int_{U_\alpha} g = \alpha$$

Thus, given a collection of n fingerprint match scores in the form of a point P, we determine when $P \in U_\alpha$ by applying the threshold function $h_\alpha$. Moreover, the probability that such a collection of scores belongs to $U_\alpha$ is $\alpha$ which can be interpreted as a predetermined false acceptance rate. The criteria $$h_\alpha(P) \geq C_\alpha$$

is used to accept the candidate when true, and reject the candidate otherwise.

Test Case

A large sample consisting of several million non-match comparisons has been generated from a database of fingerprint images in order to create a relative frequency distribution, F(X) of non-matching fingerprint scores. X=score($T_a$, $T_b$), where $T_a$, $T_b \in \tau$ are templates of different fingerprints. Note that the frequency distribution is a function of a discrete variable. For the purposes of the test case, we assumed that a continuous probability density function, $f(x)$, of non-matching fingerprint comparisons exists, and all derivations are performed for the continuous case. When a calculation was required in dependence upon actual data, $f$ was approximated by F, and integration was replaced by summation.

When we are given a sequence of n non-matching fingerprint scores, $\{x_i\}$, $1 \leq i \leq n$, then an n-dimensional probability density function, g, is derived as follows: Let $$P = (x_1, x_2, \ldots, x_n)$$

be a particular ordering of the sequence.
Define $$g(P) = \prod_i^n f(x_i);$$

since $$\int_R f = \int_S f = \int_0^\infty f(x)dx = 1$$

and $$R^n = R^{n-1} \times R$$

then it follows that $$\int_{R^n} g = \int_{R^n} \prod_i^n f(x_i) d\bar{x} = \int_{R^{n-1}} \left( \int_R \left( \prod_i^{n-1} f(x_i) \right) f(x_n) dx_n \right) dx^{n-1}$$

$$= \int_{R^{n-1}} \left( \prod_i^{n-1} f(x_i) \int_R f(x_n) dx_n \right) dx^{n-1} = \int_{R^{n-1}} \left( \prod_i^{n-1} f(x_i) \cdot 1 dx^{n-1} \right)$$

$$= \int_{R^{n-1}} \left( \prod_i^{n-1} f(x_i) dx^{n-1} \right)$$

Repeatedly applying iterated integrals in such a manner, eventually results in $$\int_{R^n} g = 1$$

When $U \subseteq R^n$, the probability that a collection of n scores of non-matching fingerprints lies in U is calculated by iterated integrals over rectangles in $R^n$ by:

$$\int_U g = \int_R g \cdot \chi u$$

where $U \subseteq R$, and R is a rectangle in $R^n$, and $\chi u$ is the characteristic function of the set U $$\chi u(P) = \begin{cases} 1 & P \in U \\ 0 & P \notin U \end{cases}$$

assuming that $\chi u$ and $f$ are integrable. In the discrete case, we analogously define $$G(P) = \prod_i^n F(x_i)$$

G(P) gives the probability that the n independent scores, $\{x_i\}$ of non-matching finger prints occur in a particular sequence. (Note that g(P) does not give a probability at any specific point since the measure, and hence the integral, over a single point is zero).

For purposes of calculating false acceptance rates in n-dimensions, we must attempt to construct regions in $R^n$ that have desirable properties. Suppose that $\alpha$ and $\beta$ are false acceptance rates. We would like to define regions $U_\alpha$, $U_\beta \subseteq R^n$ such that:

$$\int_{U_\alpha} g = \alpha \text{ and } \int_{U_\beta} g = \beta \tag{1}$$

$$U_\alpha = \{P \in S^n | h_\alpha(P) \geq C_\alpha\}, U_\beta = \{P \in S^n | h_\beta(P) \geq_\beta C\} \tag{2}$$

$$\alpha \leq \beta \Rightarrow U_\alpha \subseteq U_\beta \tag{3}$$

$$h_\alpha(P) = C_\alpha \Rightarrow g(P) \approx K_\alpha, \quad h_\beta(P) = C_\beta \Rightarrow g(P) \approx K_\beta \tag{4}$$

The first condition simply defines a false acceptance rate as a probability. The second condition indicates that regions are bounded below by a threshold function where $C_\alpha$, $C_\beta$ are non-negative constants. The third condition states that when a point is a member of a false acceptance region with a lower probability, it also belongs to a false acceptance region associated with a higher probability. One way to achieve this is to have $h_\alpha = h_\beta$, (i.e. use the same function) and let $C_\beta \leq C_\alpha$.

The last condition attempts to ensure that points along or proximate the region boundaries retain substantially level contours on the n-dimensional probability density function. This reduces uneven boundaries "favouring" certain combinations of match scores.

It is worth noting that corresponding n-dimensional false rejection rates are calculated assuming that an analogous n-dimensional probability density function, g* is constructed from the probability density function of fingerprint match scores. The corresponding false rejection rate for an n-dimensional false rejection rate $_\alpha$ is given by:

$$\int_{S^n - U_\alpha} g*$$

Alternatively, the method is employed with retinal scanned biometric information. Further Alternatively, the method is employed with palm prints. Further Alternatively, the method is employed with non image biometric data such as voice prints.

Figure 18:
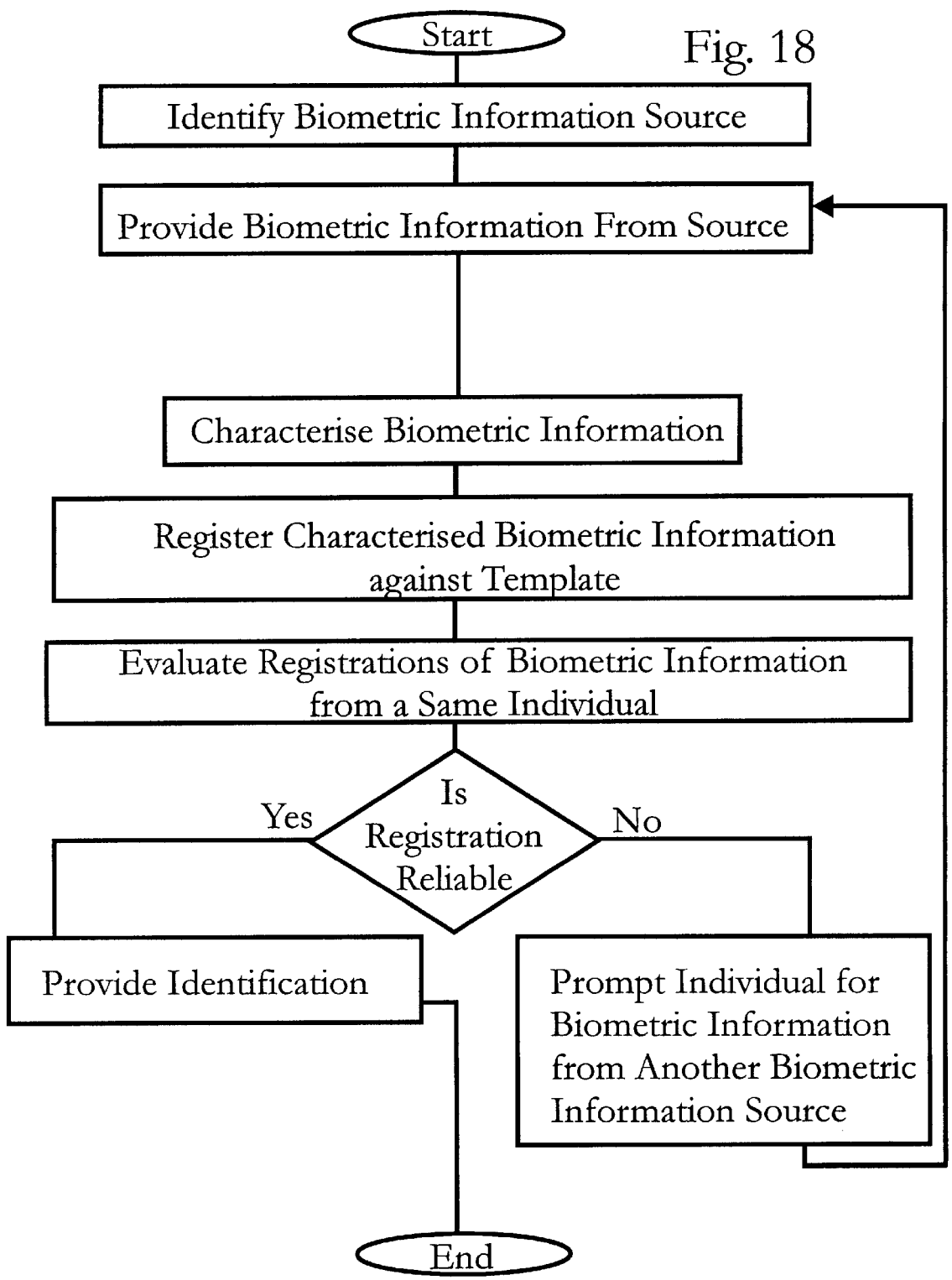
FIG. 18 is a flow diagram of another method of providing biometric information and identifying an individual in dependence thereon according to the invention.

One consequence of two different biometric sources is that the above math is complicated significantly. As a false acceptance rate for fingerprints may differ significantly from that of voice recognition devices or retinal scans, a different f(x) arises for the two latter cases resulting in asymmetric regions. For only fingerprint biometric information, ordering of samples is unimportant as false acceptance rates are substantially the same and therefor, the regions defined for registration are symmetrical as shown in FIG. 18. When different biometric source types are used and different functions for false acceptance result, order is important in determining point coordinates and an axis relating to voice recognition false acceptance should be associated with a coordinate value for same.

Referring to FIG. 18, a method of improving security without requiring performance of additional steps by most individuals is shown. A user presents biometric information to a biometric input device. The information is characterised and the characterised information is matched against a template. When a successful registration occurs, data associated with the successfully registered template is retrieved and from that data, other templates are identified that are similar. Comparison with those templates is performed to determine whether the registration was unique. When the registration is unique, user identification is made and the process is complete. When an unsuccessful registration occurs, the user is prompted for other biometric information. Optionally, the system prompts for each biometric information source a plurality of consecutive times.

For example, a user presents their index finger to a fingerprint scanner; registration fails and access is denied. The user again presents their index finger to the fingerprint scanner; registration fails and access is denied. The user again presents their index finger to the fingerprint scanner; registration fails and access is denied. The user is prompted to present their middle finger to the fingerprint scanner. Alternatively, the user selects and identifies their middle finger as the next biometric information source. The registration of the middle finger is performed according to the invention and therefore is not a same registration process as when the middle finger is the first finger presented to the scanner. The registration relies on the best registration value from the index fingerprints and, with the registration results from the middle finger, determines whether identification should proceed. When unsuccessful registration occurs, the middle finger is presented two more times. When registration is still unsuccessful, another biometric source is requested or is selected by the user. Optionally, when registration results fall below a predetermined threshold, user identification fails. Alternatively, user identification fails when known biometric information sources of the user are exhausted. Of course, whenever a resulting registration value considered with previous registration values according to the invention results in a sufficiently accurate identification, data relating to the identification and indicative of potential errors in identification is retrieved and evaluated. Comparisons with other templates in accordance with the retrieved data are performed. When the comparisons result in no substantial matches, identification of the individual results. Otherwise, further fingerprints are presented to the fingerprint scanner until only one substantially correct identification results.

Advantages to this method are that the convenience of current fingerprint registration systems is retained for a many individuals; for a number of individuals, an extra fingerprint sample from another finger is required; and, from a small number of individuals, several fingerprints are required. The number is dependent on fingerprint quality, fingerprint characterisation process, desired level of security, population size, distinctiveness of biometric information, etc. It is evident to those of skill in the art that when individuals are enrolled, biometric information from a plurality of biometric information sources is provided, characterised and associated/stored with their identification.

Because of the nature of, for example, fingerprints, the use of multiple fingerprints from a same individual provides an additional correlation as discussed herein. In an embodiment, with each fingerprint presented, analysis and registration provides one of three results—identified, rejected, unsure. When unsure, more biometric information is requested. The individual provides additional fingerprint data and again one of the three results is provided. When a final identification or a rejection occurs, the process stops. Optionally, a log of access attempts is maintained for later review.

In a further refinement of the embodiment, the processor prompts a user for their identity. When the user provides identification, biometric information is requested from sources in an order that is most likely determinative of the user identity.

For example, when biometric information from an index finger is provided and registered but fails to sufficiently identify the user, further biometric information is requested. The biometric information requested is selected such that a highest likelihood of identification results. Alternatively, the biometric information source is selected such that a highest likelihood of rejection results. Should the next sample of biometric information fail to be determinative— identification or rejection, further biometric information from another source is requested again attempting to make a final determination fastest.

When a user identity is not provided, a data structure indicating a next biometric information source to request is produced from all biometric information. In dependence upon a registration value of a current biometric information sample, user identification, rejection, or requesting further biometric information results. In the latter case, the requested information is determined based on the known biometric information and registration values associated therewith. For example, biometric information is provided from a first biometric information source. Registration is performed and is inconclusive. It is determined that a particular biometric information source comprises information most likely to result in identification or failure thereby being determinative; that biometric information source is polled.

When selecting subsequent biometric information sources, preferably, all possible outcomes are analysed and the outcome of failed identification is not itself considered a single outcome but is weighted more heavily. The advantages to this approach are evident from the example below.

In another example for use in identifying individuals by searching a database of enrolled individuals, biometric information is provided from a right thumb. Registration is performed and is inconclusive determining that the right thumb is likely that of John, Susan, or Peter but may also be that of Jeremy, Gail, or Brenda. Reviewing data associated with John, Susan, or Peter, it is determined that Joe is sometimes confused with each of these three. A next biometric information source is selected such that clear discrimination between the individuals results and a likely identification will occur. The next biometric information source is one that easily eliminates a large number of the potential individuals. In this example, the right ring finger is selected because Susan and Peter have very distinctive ring fingers. Biometric information from the right ring finger is provided and registered with templates in the database. Though the right ring finger is most likely that of Jim or Susan, it is evident that Susan, appearing in both lists, is the front runner. Data associated with Jim is retrieved and it is determined that Susan is sometimes erroneously identified as Jim. Also, the registration result for Peter is sufficiently low that it is unlikely that Peter is the individual. Though neither registration value would identify Susan on its own with the desired level of security, when the two registrations are taken together, Susan is indeed identified. Alternatively, when the resulting list is still not conclusive—two or more people identified or no one identified with sufficient certainty, further biometric information from another biometric information source is requested.

The data is arranged such that in dependence upon previous registration results a next biometric information source is polled. Using such a system, searching large databases for accurate registration is facilitated and reliability is greatly increased. Preferably, the database is precompiled to enhance performance during the identification process.

In another embodiment, templates are formed by characterising a plurality of fingerprints of an individual and constructing a single composite template comprising fingerprint information from each fingerprint. Using such a composite template, identification of biometric information sources is obviated. For example, an individual provides a fingerprint to a biometric imaging device. The imaged fingerprint is provided to a processor. The processor need not be provided with information regarding the biometric source—the exact finger—in order to perform template matching. The fingerprint is registered with a single composite template to produce a registration value. The registration value is used to identify the individual, prompt the individual for another fingerprint, or reject the individual.

Methods of forming composite templates include selecting a plurality of features from each fingerprint, selecting similar features from each fingerprint, forming a data structure indicative of fingerprint identification and indicative of features, etc. In an embodiment a data structure comprises a first feature to verify. When present, a next feature or set of features is verified. When absent a different feature or set of features is verified. By providing the data in a tree structure such as a binary tree, finger and registration values are identified simultaneously. Also, a data structure allows for compilation of a known group of biometric information, e.g. 10 fingerprints, for use with the present invention wherein identification is dependent upon a plurality of different biometric information samples.

Alternatively, single composite templates having a plurality of features from each fingerprint are formed by mapping selected features and information regarding the features into the composite template. This allows for a processing of the template against a characterised fingerprint to produce a registration value. Often, the registration process using composite templates is different from that using individual templates.

Another method of forming composite templates is to form templates having finer and finer resolutions each associated with a smaller group of templates. For example, a first coarse template determines whether or not to match the characterised fingerprint against other finer templates. In use, a fingerprint is compared against coarse templates. When a match within predetermined limits occurs, finer templates associated with the coarse template are also matched against the fingerprint. When the match is not within predetermined limits, the finer templates associated with the coarse templates and all finer templates associated therewith are excluded from further matching. This improves performance of the individual identification system.

The arrangement of data for the present method is similar to that of a tree structure. A coarse template may be a same template for different finer templates. Therefore, registration is performed against a small number of coarse templates in order to limit the number of finer templates. The process is repeated at each node of the tree until an identification of the individual or until a most likely node is determined. Further biometric information from a different biometric information source is registered in a similar fashion. Because each node as one descends throughout the tree structure toward the leaves is related to fewer individuals, an intersection of potential individuals from each search determines potential identifications. Preferably, more than one potential node is identifiable with each biometric information source. For example, registration of the index finger results in a selection of two nodes—a and b. Each node is associated with a number of individuals. Registration of the middle finger is associated with three different nodes—c, d, and e. An intersection (a∪b)∩(c∪d∪e) results in potential identifications. When the intersection contains a small number of individuals, registration against individual templates is performed according to the method and using each biometric sample provided from a different biometric information source in order to identify the individual with a predetermined level of security.

Of note, when using different biometric information sources, an asymmetric probability distribution results. This often makes determination of threshold functions more difficult. In an embodiment, when an asymmetry exists in the probability distribution function, weighting of registration values is used. This allows for balancing of inconsistencies in registration processes for different biometric information sources or, alternatively, more emphasis on certain biometric information sources than on others.

Numerous other embodiments may be envisaged without departing from the spirit and scope of the invention.

What is claimed is:

1. A method of identifying an individual comprising the steps of:

a) receiving a biometric information sample from a biometric information source of the individual;

b) characterising the biometric information sample;

c) comparing the characterised biometric information sample against some of a plurality of stored templates to identify a template that closely matches the characterised biometric information sample, wherein some templates belong to different individuals;

d) based upon data stored associated with the identified template and indicative of further templates relating to different individuals from the plurality of stored templates that are each similar to the identified template and are potentially confusing therewith, determining further templates relating to further individuals different from the individual to which the identified template relates;

e) verifying the identified template by performing the step of comparing the characterised biometric information sample against a template from the further templates to determine a likelihood that the characterised biometric information sample closely matches the template from the further templates; and f) identifying the individual based on the identified template when a match between the characterised biometric information sample and the template from the further templates has a likelihood outside a first range of likelihoods.

2. A method of identifying an individual as defined in claim 1 wherein the step of comparing the characterised biometric information sample against a template from the further templates to determine a likelihood that the characterised biometric information sample closely matches the template from the further templates is performed for each template from the further templates and wherein the step of identifying the individual is performed when each of the determined likelihoods is outside a first range of likelihoods.

3. A method of identifying an individual presenting a biometric information sample to a system as defined in claim 1 comprising the step of:

prompting the individual to present the biometric information source when the likelihood is within a first range of likelihoods.

4. A method of identifying an individual presenting a biometric information sample to a system as defined in claim 1 comprising the step of:

prompting the individual to present a further different biometric information source when the likelihood is within a first range of likelihoods.

5. A method of identifying an individual presenting a biometric information sample to a system as defined in claim 4 wherein the first biometric information source is a fingertip and the further biometric information source is a fingertip from a different finger of the individual.

6. In a system wherein biometric data are stored in a database, a method of performing one of user authorisation and user identification comprising the steps of:

a) providing a biometric information sample;

b) comparing data based on the biometric information sample and the biometric data to locate data of different individuals within the biometric data that is indicative of a substantial match with the biometric information sample;

c) determining further data from data associated with the located data indicative of a substantial match, the further data indicative of biometric data relating to individuals other than an individual to whom the located data indicative of a substantial match relates that has a known potential for allowing determination of a false acceptance between biometric data and the located data;

d) verifying the identified template by performing the step of comparing the data based on the biometric information sample and the further data from the database to provide comparison results indicating likely data that is a substantial match and likely data that is not a correct substantial match and would result in a false acceptance; and, e) when the comparison results are indicative of one substantial match with the biometric information sample, performing at least one of user authorisation and user identification in dependence upon the one substantial match.

7. A method of performing one of user authorisation and user identification as defined in claim 6 comprising the step of:

when the comparison results are indicative of a further substantial match with the biometric information sample, prompting for a further biometric information sample.

8. A method of performing one of user authorisation and user identification as defined in claim 7 wherein the further biometric information sample is a biometric information sample from a different biometric information source.

9. A method of performing one of user authorisation and user identification as defined in claim 6 wherein the step of comparing data based on the biometric information sample and the biometric data is performed only until a first comparison indicative of a substantial match with the biometric information sample results.

10. A method of performing one of user authorisation and user identification as defined in claim 6 wherein the step of performing at least one of user authorisation and user identification comprises performing user identification.

11. In a system wherein biometric data are stored in a database, a method of identifying comparisons indicative of potential false acceptance comprising the steps of:

comparing data based on a biometric information sample associated with first data within the biometric data and the biometric data to locate second data related to another individual within the biometric data that is indicative of a substantial match with the biometric information sample to provide comparison results; and, when a comparison result is indicative of a substantial match and the second data is other than the first data, storing information in association with the first data the information indicative of the second data.

12. A method of identifying comparisons indicative of potential false acceptance as defined in claim 11 wherein the step of comparing data is performed until the biometric information sample is compared with the biometric data to identify each possible match.

13. A method of identifying comparisons indicative of potential false acceptance as defined in claim 11 wherein a substantial match is a comparison wherein the likelihood of a match is above a predetermined threshold.

14. A method of identifying comparisons indicative of potential false acceptance as defined in claim 11 wherein the information is indicative of identification.

15. A method of identifying comparisons indicative of potential false acceptance as defined in claim 11 wherein the biometric data comprises templates derived from biometric information, the templates for comparison with captured biometric data.

16. A method of storing data relating to biometric information in a database for use in identifying individuals comprising the steps of:

storing data associated with a first biometric information sample and a corresponding identification of an individual; and, storing a list of data associated with other biometric information samples corresponding to identifications of other individuals within the database, some of the biometric data associated with the other biometric information samples having a significant similarity to data associated with the first biometric information sample.

17. A method of storing biometric information in a database for use in identifying individuals as defined in claim 16 wherein the biometric information is fingerprint data.

18. A method of registering biometric information from a source, comprising the steps of:
   a) providing an instance of biometric information from the source;
   b) storing a template relating to the provided biometric information in a database comprising a plurality of templates;
   c) comparing the biometric information against a further template of a different individual to determine a likelihood that the biometric information matches the further template;
   d) when the likelihood is within a first range of likelihoods, storing data relating to the further template for use in distinguishing between the stored template and the further template to potentially reduce a number of false acceptances and false rejections in association with the data based on the biometric information.

19. A method of registering biometric information from a source as defined in claim 18 comprising the step of storing the determined likelihood that the biometric information matches the further template in association with the data relating to the further template.

20. A method of storing biometric information in a database for use in identifying individuals as defined in claim 18 wherein the biometric information is fingerprint data.

21. A method of registering biometric information in a database for use in identifying individuals as defined in claim 18 comprising:
   providing a plurality of different instances of a same biometric information of an individual from the biometric input device to a processor;
   selecting each instance of the plurality of different instances;
   for each selected instance comparing that selected instance with other of the different instances of a same biometric information provided by the individual, and determining a registration value corresponding to similarities or differences between each selected instance; and,
   selecting as the biometric template an instance from the plurality of different instances for which the registration value is within predetermined limits.

22. A method of registering biometric information from a source as defined in claim 18 comprising the step of:
   when the likelihood is within the first range of likelihoods, storing data relating to a biometric information source selected so as to distinguish between the provider of the previously stored biometric information and the provider of the biometric information from which the further template is determined.

23. A method of registering biometric information from a source, comprising the steps of:
   a) providing an instance of biometric information from the source;
   b) storing a template relating to the provided biometric information in a database comprising a plurality of templates;
   c) comparing previously stored biometric information of different individuals against the stored template to determine a likelihood that the previously stored biometric information related to a different individual matches the stored template; and,
   d) when the likelihood is within a first range of likelihoods, storing data relating to the previously stored biometric information and related to a different individual associated with the data based on the biometric information.

24. A method of registering biometric information from a source as defined in claim 23 comprising the step of storing the determined likelihood that the biometric information matches the further template in association with the data relating to the further template.

25. A method of storing biometric information in a database for use in identifying individuals as defined in claim 23 wherein the biometric information is fingerprint data.

26. A method of registering biometric information from a source as defined in claim 23 comprising the step of:
   when the likelihood is within the first range of likelihoods, storing data relating to a biometric information source selected so as to distinguish between the provider of the previously stored biometric information and the provider of the biometric information from which the stored template is determined.

* * * * *

UNITED STATES PATENT AND TRADEMARK OFFICE
CERTIFICATE OF CORRECTION

PATENT NO. : 6,259,805 B1
DATED : July 10, 2001
INVENTOR(S) : Freedman et al.

It is certified that error appears in the above-identified patent and that said Letters Patent is hereby corrected as shown below:

<u>Column 16,</u>
Line 60, "$f(x_i) \leq 0$" should read -- $f(x_i) \geq 0$ --,
"$g(P) \leq 0$" should read -- $g(P) \geq 0$ --.

Signed and Sealed this

Second Day of April, 2002

Attest:

JAMES E. ROGAN
*Director of the United States Patent and Trademark Office*

*Attesting Officer*